US008857028B2

(12) United States Patent
Gates et al.

(10) Patent No.: US 8,857,028 B2
(45) Date of Patent: Oct. 14, 2014

(54) PROCESSES FOR PRODUCING OPTICAL ELEMENTS SHOWING VIRTUAL IMAGES

(75) Inventors: Brian J. Gates, Osceola, WI (US); Charles A. Marttila, Shoreview, MN (US); Travis L. Potts, Woodbury, MN (US); Serge Wetzels, Newport, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 484 days.

(21) Appl. No.: 13/002,118

(22) PCT Filed: Jun. 16, 2009

(86) PCT No.: PCT/US2009/047441
§ 371 (c)(1),
(2), (4) Date: Dec. 30, 2010

(87) PCT Pub. No.: WO2010/005706
PCT Pub. Date: Jan. 14, 2010

(65) Prior Publication Data
US 2011/0179631 A1 Jul. 28, 2011

Related U.S. Application Data

(60) Provisional application No. 61/078,974, filed on Jul. 8, 2008.

(51) Int. Cl.
*B23Q 17/00* (2006.01)
*H04N 13/04* (2006.01)
*G02B 27/22* (2006.01)
*B42D 25/00* (2014.01)
*G02B 27/02* (2006.01)
*B42D 15/00* (2006.01)

(52) U.S. Cl.
CPC ........ *G02B 27/2292* (2013.01); *H04N 13/0404* (2013.01); *B42D 2035/20* (2013.01); *B42D 15/10* (2013.01); *G02B 27/022* (2013.01); *B42D 15/0013* (2013.01); *B42D 2035/44* (2013.01)
USPC .......................... 29/407.01; 359/530; 359/619

(58) Field of Classification Search
USPC ............... 359/530, 619, 620, 627; 428/195.1; 707/802, E17.019
See application file for complete search history.

(56) References Cited

U.S. PATENT DOCUMENTS 3,154,872 A  11/1964  Nordgren
3,801,183 A   4/1974  Sevelin
(Continued)

FOREIGN PATENT DOCUMENTS

EP    0195104    9/1986
EP    1844921    10/2007
(Continued)

OTHER PUBLICATIONS

Igarashi et al., "3-D Display System Using a Computer Generated Integral Photograph", Japanese Journal of Applied Physics, vol. 17, No. 9, pp. 1683-1684, 1978.
(Continued)

*Primary Examiner* — Alexander P Taousakis
(74) *Attorney, Agent, or Firm* — Yufeng Dong; Daniel J. Iden; Kristofor L. Storvick

(57) ABSTRACT

A virtual image (VI) device displays an image that appears to lie above or below the plane of the device. A method of manufacturing a VI display device includes calculating an initial VI flux pattern based on an object and then fabricating a substrate having a VI array pattern based on the initial VI flux pattern. A plurality of lenses may then be applied over the VI array pattern. The VI substrate may be static or dynamic, and may show grey scale information. A photomask may be used as an intermediate element in the manufacture of the VI substrate, or may act as the VI substrate itself. A method of producing the initial VI flux pattern includes virtually tracing rays generated by different points of the object to an image plane and ii) summing the rays from the different points. The rays may be traced through a lens array.

14 Claims, 14 Drawing Sheets

(56) References Cited

U.S. PATENT DOCUMENTS

| | | | |
|---|---|---|---|
| 4,082,426 A | | 4/1978 | Brown |
| 4,099,838 A | * | 7/1978 | Cook et al. ............ 359/537 |
| 4,200,875 A | | 4/1980 | Galanos |
| 4,645,301 A | * | 2/1987 | Orensteen et al. ............ 380/54 |
| 5,279,912 A | * | 1/1994 | Telfer et al. ............ 430/17 |
| 5,581,605 A | * | 12/1996 | Murakami et al. ............ 378/84 |
| 6,288,842 B1 | | 9/2001 | Florczak |
| 7,333,268 B2 | * | 2/2008 | Steenblik et al. ............ 359/619 |
| 7,738,175 B2 | * | 6/2010 | Steenblik et al. ............ 359/619 |
| 7,775,666 B2 | | 8/2010 | Kubara et al. |
| 8,310,760 B2 | * | 11/2012 | Steenblik et al. ............ 359/619 |
| 2002/0114078 A1 | * | 8/2002 | Halle et al. ............ 359/619 |
| 2003/0058472 A1 | | 3/2003 | Davies et al. |
| 2006/0262411 A1 | * | 11/2006 | Dunn et al. ............ 359/619 |
| 2008/0037131 A1 | * | 2/2008 | Steenblik et al. ............ 359/619 |
| 2009/0097114 A1 | * | 4/2009 | Mimura et al. ............ 359/463 |
| 2010/0231860 A1 | * | 9/2010 | Maekawa ............ 353/10 |
| 2012/0281294 A1 | * | 11/2012 | Camus et al. ............ 359/619 |
| 2014/0085865 A1 | * | 3/2014 | Yun et al. ............ 362/97.1 |

FOREIGN PATENT DOCUMENTS

| | | |
|---|---|---|
| WO | WO 2006/135776 A2 | 12/2006 |
| WO | WO 2007/146634 A1 | 12/2007 |
| WO | WO 2010/005729 | 1/2010 |

OTHER PUBLICATIONS

Jang et al., "Spatiotemporally multiplexed intergral imaging projector for loarge-scale high-resolution three-dimensional display", Optics Express, pp. 557-563, vol. 12, No. 4, Feb. 23, 2004, © 2004 OSA.

Liao et al., "Integral videography: a new 3-D autostereoscopic medical image", The 6th International Congerence on Biomedical Engineering and Rehabilitation Engineering, ICBME 2002, pp. 172-175 (May 27-30, 2002 China).

Martinez-Cuenca et al., "Optically-corrected elemental images for undistorted Integral image display", Optics Express, pp. 9657-9663, vol. 14, No. 21, Oct. 16, 2006, © 2006 OSA.

Min et al., "Enhanced Image Mapping Algorithm for Computer-Generated Integral Imaging System", Japanese Journal of Applied Physics, vol. 45, No. 28, pp. L744-L747, 2006.

Park et al., "Three-dimensional display scheme based on integral imaging with three-dimensional information processing", Optics Express, pp. 6020-6032, vol. 12, No. 24, Nov. 29, 2004, © 2004 OSA.

Shin et al., "Computational Technique of Volumetric Object Reconstruction in Integral Imaging by Use of Real and Virtual Image Fields", ETRI Journal, vol. 27, No. 6, pp. 708-712, Dec. 2005.

U.S. Appl. No. 60/990,446, entitled "Methods for Forming Sheeting With a Composite Image that Floats and a Master Tooling", filed on Nov. 27, 2007.

Search Report for International Application No. PCT/US2009/047441.

Written Opinion for International Application No. PCT/US2009/047441.

Search Report for International Application No. PCT/US2009/047524.

Written Opinion for International Application No. PCT/US2009/047524.

Min et al., *Three-dimensional Display System Based on Computer-Generated Integral Photography*, Proceedings of SPIE, vol. 4297, 2001.

\* cited by examiner

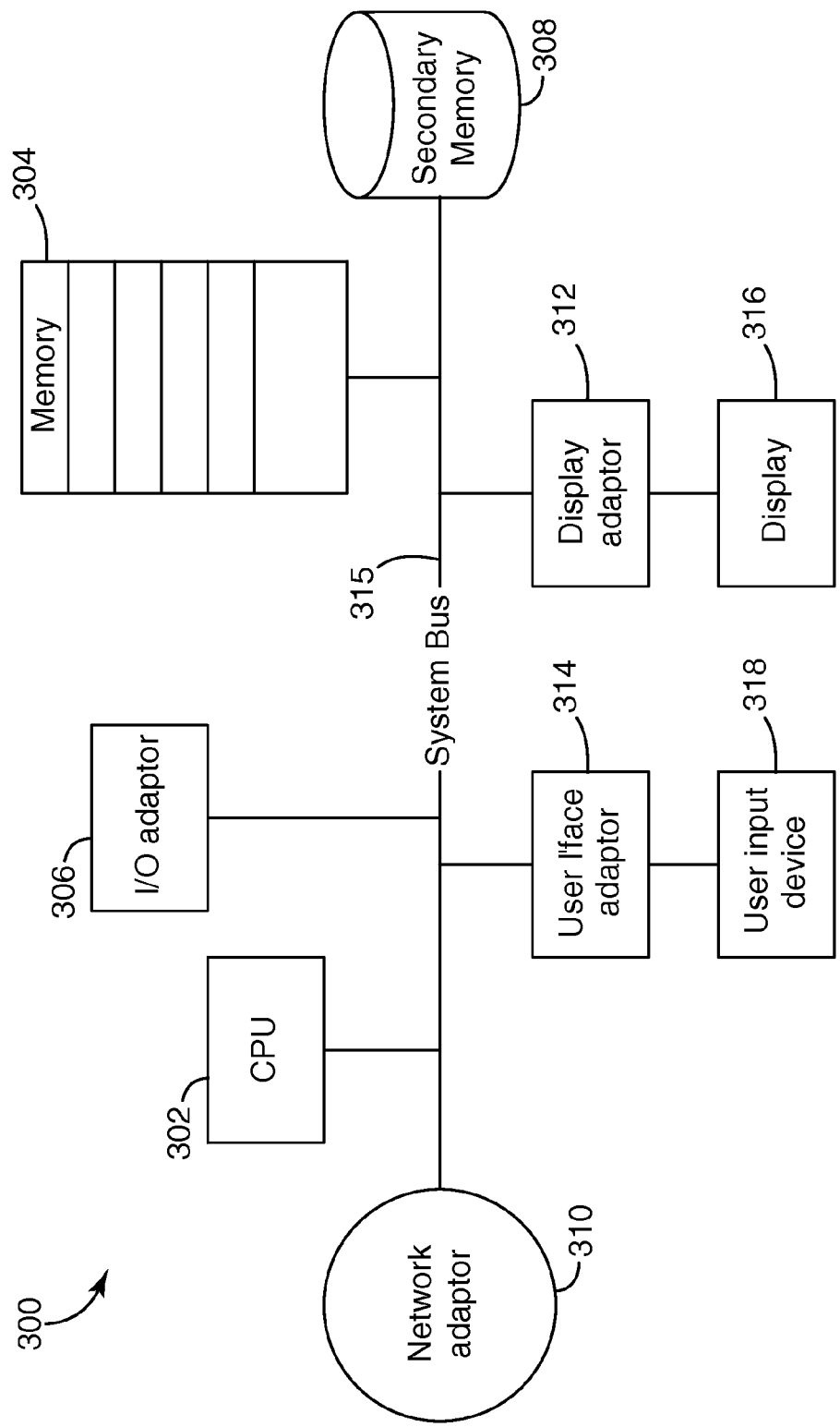

PROCESSES FOR PRODUCING OPTICAL ELEMENTS SHOWING VIRTUAL IMAGES

CROSS REFERENCE TO RELATED APPLICATIONS

This application is a national stage filing under 35 U.S.C. 371 of PCT/US2009/047441, filed on Jun. 16, 2009, which claims priority to U.S. Provisional Application No. 61/078, 974, filed on Jul. 8, 2008, the disclosure of which is incorporated by reference in its/their entirety herein.

FIELD OF THE DISCLOSURE

The present invention relates to optical devices that use a substrate and provide one or more composite images that are perceived by an observer to be suspended in space relative to the substrate, in which the perspective of the composite image changes with the viewing angle, and to methods of making such devices.

BACKGROUND

Sheeting materials that have a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, music media, playing cards, beverage containers, and the like. Other uses include graphics applications for identification purposes such as on police, fire or other emergency vehicles, in advertising and promotional displays and as distinctive labels to provide brand enhancement.

Another form of imaged sheeting, disclosed in U.S. Pat. No. 4,200,875, discloses the use of a plurality of transparent glass microspheres partially embedded in a binder layer and partially exposed above the binder layer, with a metal reflective layer coated on the embedded surface of each of the plurality of microspheres. Images are formed by laser irradiation of the sheeting through a mask or pattern. The images can only be viewed if the sheeting is viewed from the same angle at which the laser irradiation was directed at the sheeting. Thus, the image is only viewable over a very limited observation angle.

Another approach to making floating image sheeting, which operates over a wider observation angle, is disclosed in U.S. Pat. No. 6,288,842, in which a microlens sheet, typically an array of closely packed microspheres embedded in a binder layer and overlies a layer of photosensitive material. The image is written into the sheet by writing one point of the image at a time onto the photosensitive layer with a pulsed laser. This process is time consuming and expensive. In addition, the color of the floating image is determined by the color of the photosensitive material or the material surrounding the photosensitive layer and is, therefore, set at the time that the sheet is manufactured, rather than at the time the image is produced.

There remains, therefore, a need to improve the speed and reduce the cost of manufacturing optical sheets that demonstrate floating images, while at the same time maintaining wide observation angles and increasing the flexibility in the use of color in floating images.

SUMMARY

One embodiment of the invention is directed to a method of manufacturing a virtual image display device for displaying an object. The method includes calculating an initial virtual image flux pattern based on the object and then fabricating a substrate having a virtual image array pattern based on the initial virtual image flux pattern. A plurality of lenses may then be applied over the virtual image array pattern.

In some embodiments, calculating the initial virtual image flux includes virtually tracing rays generated by different source facets on the object to an image plane and summing the rays from different source facets of the object at different locations in an image plane to form the initial virtual image flux pattern Another embodiment of the invention is directed to a method of making a virtual image element. The method includes forming a virtual image substrate; and then placing a plurality of lenses proximate the virtual image substrate after forming the virtual image substrate.

Another embodiment of the invention is directed to method of making an intermediate virtual image mask used for making a virtual image device depicting an object. The method includes determining an initial virtual image flux pattern based on the object and patterning a mask having an intermediate virtual image pattern derived from the initial image array pattern.

Another embodiment of the invention is directed to a method of controlling a computer to produce a dataset corresponding to an initial virtual image flux pattern of an object. The method includes i) virtually tracing rays generated by different source facets on the object to an image plane and ii) summing the rays from different source facets of the object at different locations in the image plane to form the initial virtual image array pattern.

Another embodiment of the invention is directed to a method of displaying an object. The method includes calculating a virtual image pattern from a virtual object and controlling a dynamic virtual image substrate disposed behind a lens array to display the virtual image pattern. The virtual image pattern is registered to lenses of the lens array, so as to provide a virtual image of the virtual object to a viewer.

Another embodiment of the invention is directed to method of determining a VI pattern. The method includes virtually tracing rays from a virtual object through a lens array.

Another embodiment of the invention is directed to a virtual image display device that includes a lens array and a static virtual image substrate disposed behind the lens array. The virtual image substrate is provided with a virtual image pattern registered to lenses of the lens array. The virtual image pattern comprises grey scale information.

Another embodiment of the invention is directed to an optical mask device that has an optical mask having a substrate and a pattern thereon. The pattern is arranged so that a virtual image of an object appears to a viewer when a lens array is applied to the mask.

Another embodiment of the invention is directed to an optical mask device that has an optical mask having a substrate and a pattern thereon. The pattern is arranged as an intermediate virtual image pattern containing information for manufacturing a virtual image substrate.

Another embodiment of the invention is directed to a virtual image display device that has a lens array and a nondynamic virtual image substrate disposed behind the lens array. The virtual image substrate is provided with a virtual image pattern registered to lenses of the lens array, the virtual image pattern comprising a first pixel of a first color and a second pixel of a second color different from the first color, wherein the virtual image display device is capable of showing a virtual image comprising the first and second colors.

The above summary of the present disclosure is not intended to describe each illustrated embodiment or every implementation of the present invention. The figures and the detailed description which follow more particularly exemplify these embodiments.

BRIEF DESCRIPTION OF THE DRAWINGS

The disclosure may be more completely understood in consideration of the following detailed description of various embodiments of the invention in connection with the accompanying drawings, in which:

FIG. 3 schematically illustrates a generalized computer system such as might be used in calculating an initial virtual image pattern, according to principles of the present invention;

Figure 1A:
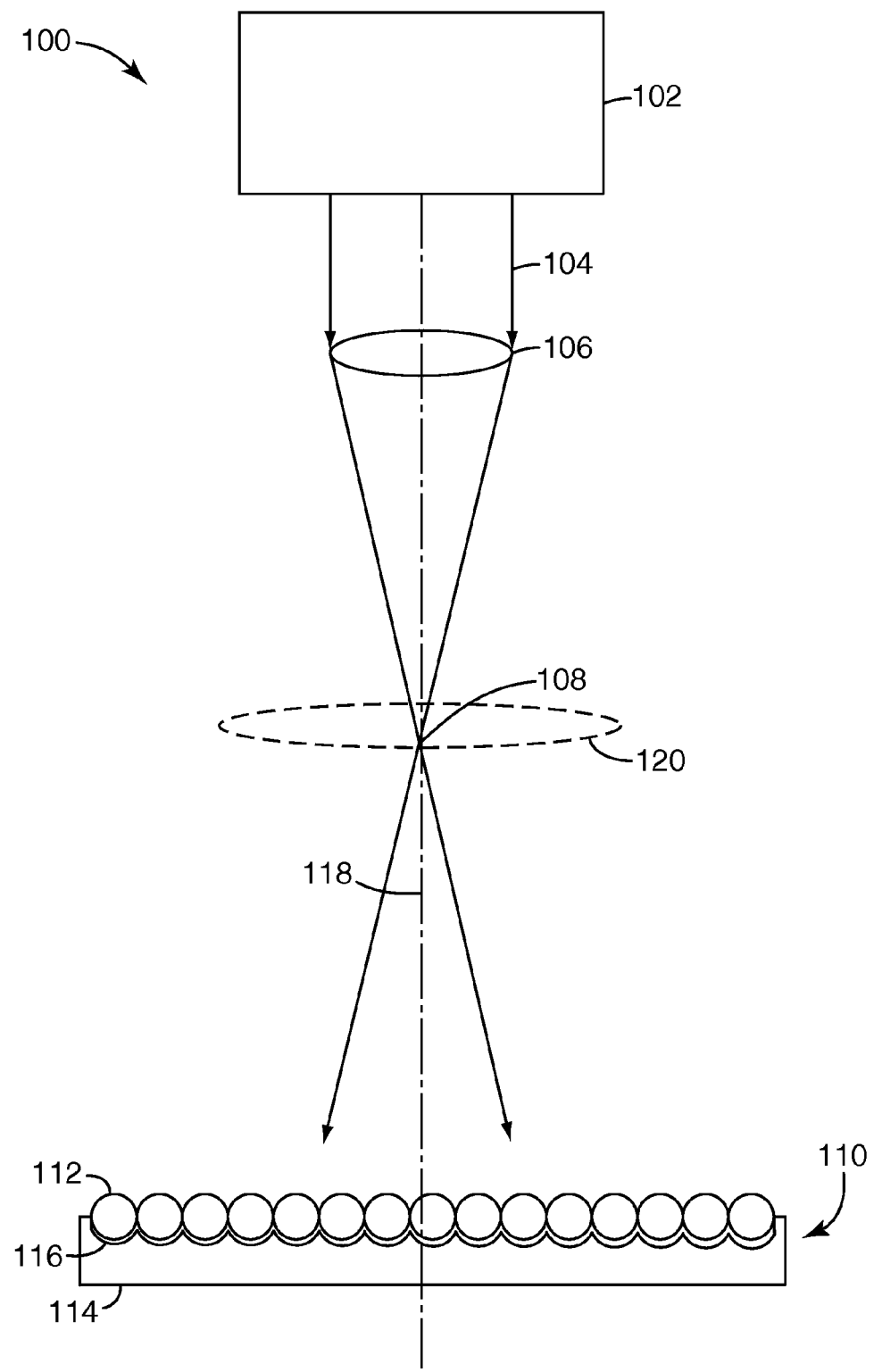
FIGS. 1A and 1B schematically illustrate a prior art approach to manufacturing optical sheets that show floating and sinking images.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention is directed to an optical device that shows a floating image and to a method of manufacturing the same. The optical device includes a pattern on a surface that, when coupled to a lens array, displays an image that appears to lie out of the plane of the surface. This image is known as a "virtual image." The virtual image can have a component that appears to float above the plane of the surface or below the plane of the surface. A component of the image that appears to be below the plane of the device may also be referred to as sinking. The virtual image may be of a one dimensional object, a two dimensional object or a three dimensional object. Some virtual images may have components that lie both above and below the plane of the surface. Another generally accepted name for a virtual image is "integral image".

A virtual image may be used in a variety of applications such as securing tamperproof images in passports, ID badges, event passes, affinity cards, product identification formats and advertising promotions for verification and authenticity, brand enhancement images which provide a floating or sinking or a floating and sinking image of the brand, identification presentation images in graphics applications such as emblems for police, fire or other emergency vehicles; information presentation images in graphics applications such as kiosks, night signs and automotive dashboard displays; and novelty enhancement through the use of composite images on products such as business cards, hang-tags, art, shoes and bottled products. This list of applications for virtual image products is not intended to be exhaustive.

Prior approaches to producing optical devices that show virtual images have relied on the use of a laser to directly write the image information into an optically sensitive layer that is covered by a microlens array. The form of the image is produced using a mask or by moving the laser around relative to the sheeting material. In contrast, according to the present invention, a substrate that contains a virtual image pattern is prepared separately, without a lens array, and is then paired with the lens array to form the optical device. The substrate is prepared by first calculating what information has to be formed onto the substrate and then forming the information on the substrate. The information can be formed on the substrate using many different methods including, but not limited to, printing and lithography. This process permits the large scale, simultaneous preparation of multiple device substrates, which significantly reduces manufacturing costs relative to present approaches in which each optical device is prepared separately by laser exposure.

FIG. 1A shows an example of a prior art approach to manufacturing optical devices that show virtual images. The "object" to be imaged is formed through the use of a laser by tracing the outline of the "object" with the laser beam. For the image thus recorded to have a composite aspect, the light from the "object" must radiate over a broad range of angles. When the light comes from a single point of the object and is radiating over a broad range of angles, all the light rays are carrying information about the object, but only from that single point, though the information is from the perspective of the angle of the light ray. In order to have relatively complete information about the object, as carried by the light rays, light must radiate over a broad range of angles from the collection of points that constitute the object.

The laser writing system 100 includes a laser unit 102 that generates a beam of light 104 which is generally collimated. A lens 106 converges the light 104 to a focus 108. The optical element 110 is disposed downstream of the focus 108. The optical element 110 includes an array of microsphere lenses 112 that are partially embedded within a substrate 114 and a photosensitive material 116 disposed behind the lenses 112. The microsphere lenses 112 typically have diameters in the range from 15 μm to 275 μm. Individual images formed in the photosensitive material 116 associated with a plurality of microlenses, when viewed by an observer under reflected or transmitted light, provide a composite image that appears to be suspended, or float, above, in the plane of, and/or below the sheeting. Photosensitive materials include coatings and films of metallic, polymeric and semiconducting materials and mixtures thereof. A material is photosensitive if, upon exposure to a given level of visible radiation, the appearance of the material exposed changes to provide an optical contrast with material that was not exposed to that radiation. Examples of some photosensitive metallic film materials include aluminum, silver, copper, gold, titanium, zinc, tin, chromium, vanadium and tantalum, which typically provide a contrast due to the difference between the native color of the metal and a modified color of the metal after exposure to the radiation, or as a result of ablation.

The lens 106 has high numerical aperture (NA, NA≧0.3) to produce a cone of highly divergent light. The axis 118 of the cone of light (the optical axis) is perpendicular to the plane of the element 110. Because each individual microsphere lens 112 occupies a unique position relative to the optical axis 118, the light reaching each microsphere lens 112 has a unique angle of incidence relative to the light incident on all other microsphere lenses 112. Thus, the light is transmitted by each microsphere lens to a unique position on the photosensitive material layer 116, and produces a unique image. Thus, a single light pulse produces only a single imaged dot on the material layer so, to provide an image adjacent each microsphere lens, multiple pulses of light are used to create that image out of multiple imaged dots. For each laser pulse, the laser 102 and lens 106 together, and/or the element 110 are translated transversely so that the optical axis 118 is located at a new position on the element 110 relative to the position of the optical axis 118 during the previous pulse. These successive changes in the position of the optical axis relative to the microsphere lenses 112 result in a corresponding change in the angle of incidence upon each microsphere lens 112, and accordingly in the position of the imaged dot created in the photosensitive material layer 116 by that laser pulse. As a result, the incident light focusing on the backside of the microsphere lenses 112 images a selected pattern in the photosensitive layer 116. Because the position of each microsphere lens 112 is unique relative to the position of the optical axis 118 for each laser pulse, the image formed in the radiation sensitive material for each microsphere lens 112 is different from the image associated with every other microsphere lens.

In the illustrated example, the object being written to the element 110 is a circle. In practice, the focus 108 of the light is moved around a locus 120 describing a circle (dashed line) relative to the element 110. The resultant information written into the element produces a virtual image of a circle when viewed. To make the viewed virtual image appear to float above the element 110, the object is positioned for writing at the focus 108 of a converging beam from the laser lens 106 such that the focus 108 and the object are both above the array of microsphere lenses 112 and the substrate 114. The arrangement illustrated in FIG. 1A shows this arrangement.

Figure 1B:
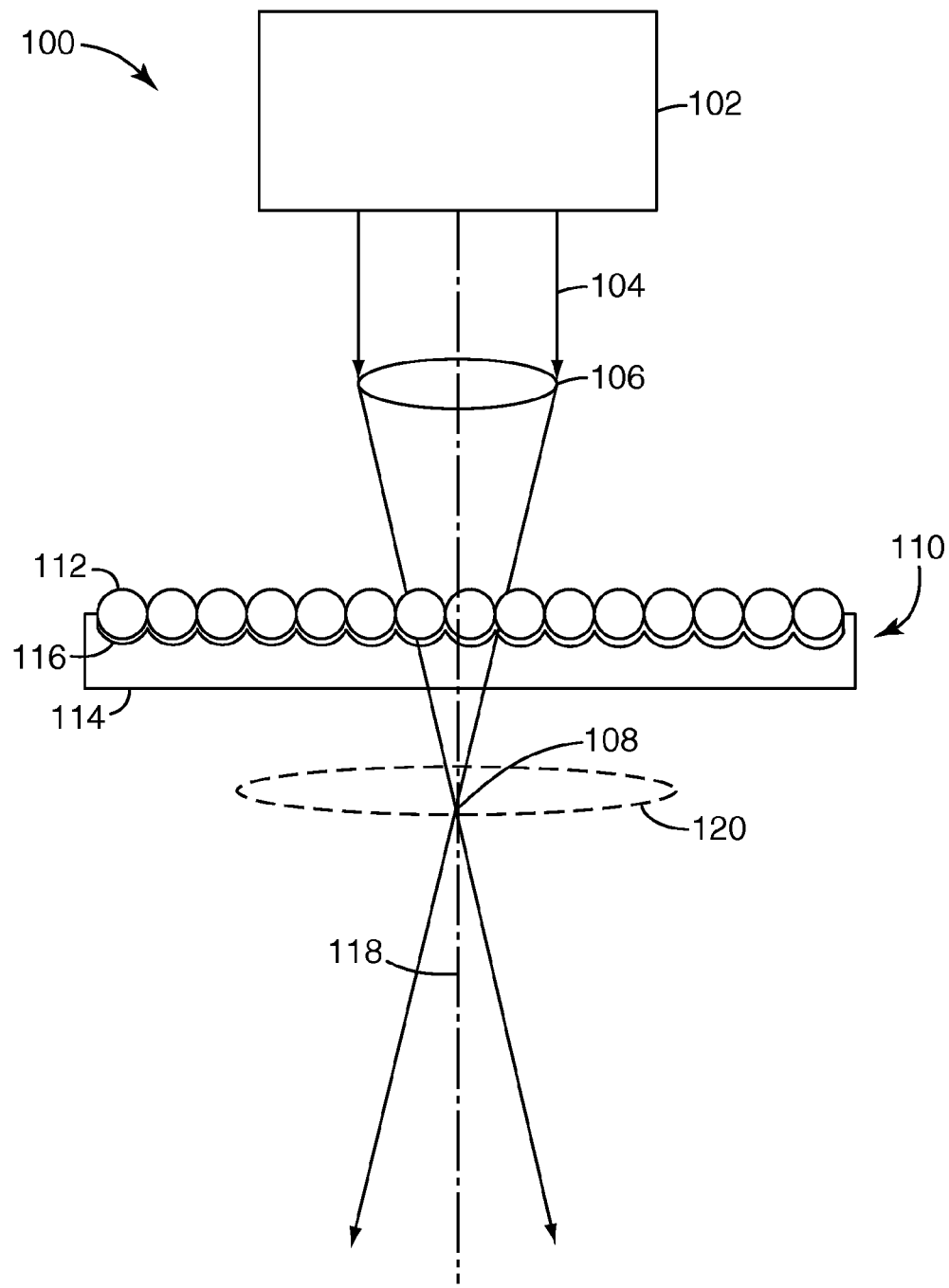

To make the viewed virtual image appear to sink below the element 110, the object is positioned for writing at the focus 108 of a converging beam from the laser lens 106 such that the focus 108 and the object are both below the array of microsphere lenses 112 and the substrate 114. This arrangement is schematically illustrated in FIG. 1B.

After writing, depending upon the size of the extended object being imaged, a full or partial image of the object will be present in the radiation sensitive material behind each microsphere lens 112. The extent to which the actual object is reproduced as an image behind a microsphere lens depends on the energy density incident upon the microsphere lens 112. Portions of an extended object may be distant enough from a region of microsphere lenses 112 that the energy incident upon those microsphere lenses 112 has an energy density lower than the level of radiation required to modify the photosensitive material 116. Moreover, for a spatially extended image, when imaging with a fixed NA lens, not all portions of the sheeting are exposed to the incident radiation for all parts of the extended object. As a result, those portions of the object will not be modified in the radiation sensitive medium and only a partial image of the object will appear behind the microsphere lenses.

Furthermore, the light beam from the laser 102 typically does not have a uniform intensity profile, but has a profile that is more intense in the center with the intensity falling off continuously out to the edge of the laser beam. Thus, the ability to write the pattern into the photosensitive layer 116 is affected by this nonuniformity and may result in a reduction in the viewing angle of the resultant virtual image. Also, the shape and/or any astigmatism in the beam of the laser beam may affect the uniformity of the viewing angle of the virtual image. For example, the range of viewing angles differs in the virtual image according to the cross-sectional axis of the writing laser beam. Where the laser beam profile is elliptical, the viewing angle of the virtual image is less along a direction parallel to the short axis of the ellipse compared to the long axis of the ellipse.

In contrast to the prior art method, the new method of forming an optical element that shows a virtual image described herein does not rely on the use of a laser to directly write a pattern into a photosensitive layer. Instead, a ray tracing algorithm is used to model the illumination of a layer by a light source, and the resulting aggregate flux profile across the layer is used as a pattern on which the physically-realized substrate is based. Under this approach, the ray tracing algorithm can assume that the light is made up of several different wavelengths, for example white light is used, or is made of a single wavelength. The use of a laser for direct writing, on the other hand, is almost entirely limited to the use of a single wavelength. Furthermore, the writing wavelength need not be the same as the wavelength at which the virtual image is viewed. For example, the virtual image may be viewed under white ambient lighting conditions while the image was laser-written using an ultraviolet or infrared wavelength. Additionally, in the case of a laser-ablation writing process, the pattern burned into the photosensitive layer is a binary pattern—the photosensitive material either remains or has been ablated. The ray-tracing algorithm, on the other hand, sums the flux reaching each point on the substrate and presents data in a grey scale, which results in higher quality images. Also, the ray tracing algorithm can assume that the light beam has a uniform intensity profile, thus avoiding the problems with laser-writing discussed above.

Figure 2:
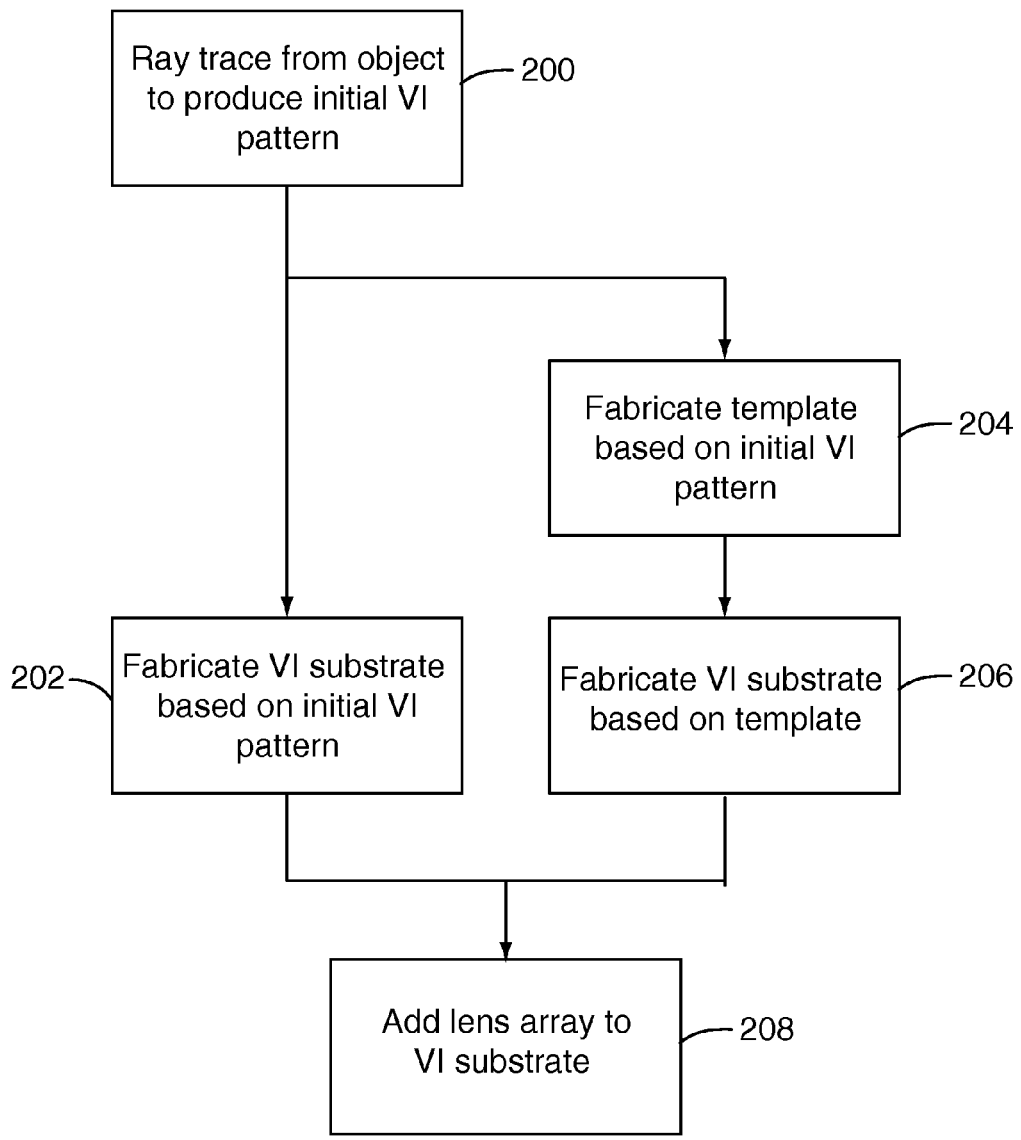
FIG. 2 presents steps in a generalized form of a method of making a virtual image device according to principles of the present invention.

A generalized flow chart that highlights certain steps of the process described herein is shown in FIG. 2. The first step 200 in the process is to produce an initial virtual image (VI) pattern by ray tracing. The initial VI pattern may then be used to pattern a virtual image substrate (VI substrate), step 202, or may be used to pattern a template, step 204, which in turn is used to generate a VI substrate, step 206. A lens array is then added to the VI substrate, step 208, to form the VI optical element.

FIG. 3 shows a diagram of a typical computer system 300 that may be suitable for use with the present invention. The computer may include a system of one or more central processing units (CPUs) 302, a memory system 304, an input/output (I/O) adapter 306, a secondary memory storage 308, a network interface 310, a user interface adapter 314, and a display adapter 312. All of the computer components are connected by a system bus 315. The display adapter 312 may be connected to a display 316 for displaying data to a user. The user interface adapter 314 may be connected to a user input device 318, such as a keyboard, mouse, barcode scanner or the like. The computer system 300 may be connected to other computers via the network interface 310, for example via a local area network, wide area network or the internet. The computer system 300 may include more than one processor, where the processors are in different locations. In such a case, the processors may be linked by input/output interfaces over a network, such as a local area network, wide area network or the Internet.

Figure 4A:
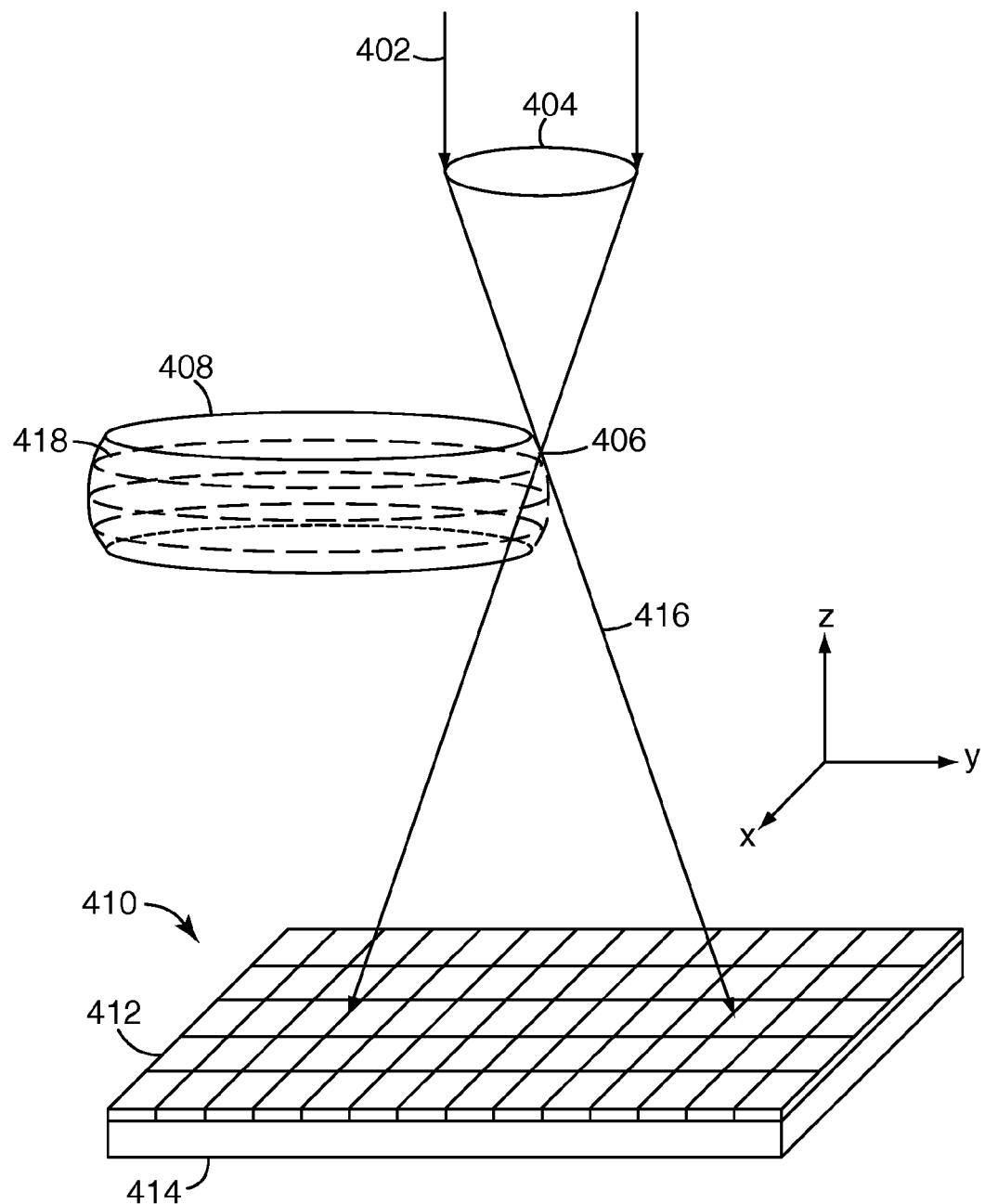
FIGS. 4A and 4B schematically illustrate the ray tracing model used in an embodiment of an algorithm for determining a virtual image flux pattern, according to principles of the present invention.

One example of a ray tracing algorithm that can be used to generate the initial VI pattern employs a model like that schematically shown in FIG. 4A. A parallel light beam 402 is incident on a lens 404 that has a focal length f. After passing through the lens 404, the light converges to a focus 406 and then diverges. A first point on the surface of an object 408 is assumed to be positioned directly at the focus 406, with a preferred orientation of the laser plus focusing lens 404 to achieve this. A typical, but not necessary, orientation is for the light beam 402 to be imaged straight down at that point relative to the lens array 412 and substrate 414. The perimeter points of the surface that are to be imaged are accessed by sequentially focusing upon the perimeter points and writing on the substrate 414, and moving the light beam 402 and the lens 404 through space in such a manner that the focus 406 falls upon different points between different exposing light pulses, while properly maintaining the orientation of the beam in space at desired angles.

Below the object 408 lies the optical element 410 where it is assumed that the virtual image will be written. The optical element 410 typically includes an array of lenses 412 over a VI substrate 414. The array of lenses 412 may be any suitable type of lens array, for example a molded lens array or an array of microsphere lenses. Also, the lenses 412 may be arranged in any suitable pattern: in the illustrated embodiment the lenses are arranged in a square pattern, but they may also be arranged in other patterns, such as an hexagonal pattern.

The light rays 416 are traced from various points on the surface of the object 408 to the substrate 414. One way to implement the ray tracing algorithm is to construct a series of horizontal slices 418 through the object 408, parallel to the x-y plane. Along the edge of each slice 418 a set of source points is formed, which represent light sources. The source points in the set may be spaced in whatever manner is desired to produce a sufficiently well resolved image of that slice 418. The creation of a set of source points along the edge of each slice 418 effectively establishes a set of facets representing the surface of the object 408. Each source point could, for example, be considered to be the center of a triangular facet on the surface of the object 408 connected to other triangular faceted neighboring source points as is commonly done in surface representation algorithms. It is not essential that the slices 416 be horizontal, in fact any partitioning of the surface will do as long as each source point represents a facet sufficiently small to create an acceptable reproduced image of the object 408. The facets need not be considered triangular: arbitrary perimeter shaping is allowed.

In the illustrated embodiment of the optical model, rays 416 are traced from successive source point around the edge of the first slice 418, then around the edge of the second slice 418, and so on, until the flux at the substrate 414 that arises from source points around the edges of all slices of the object has been summed, to obtain the total flux pattern generated by the object 408.

The virtual 3D image arising from the model shown in FIG. 4A is made from a transparent object 408. That is, the light rays that trace the object 408 act independently for each source point on the object's surface, ignoring the presence of other objects and their source points, effectively making them seem transparent. Since any object being represented is defined by the sources and their properties, the object too is transparent.

Figure 4B:
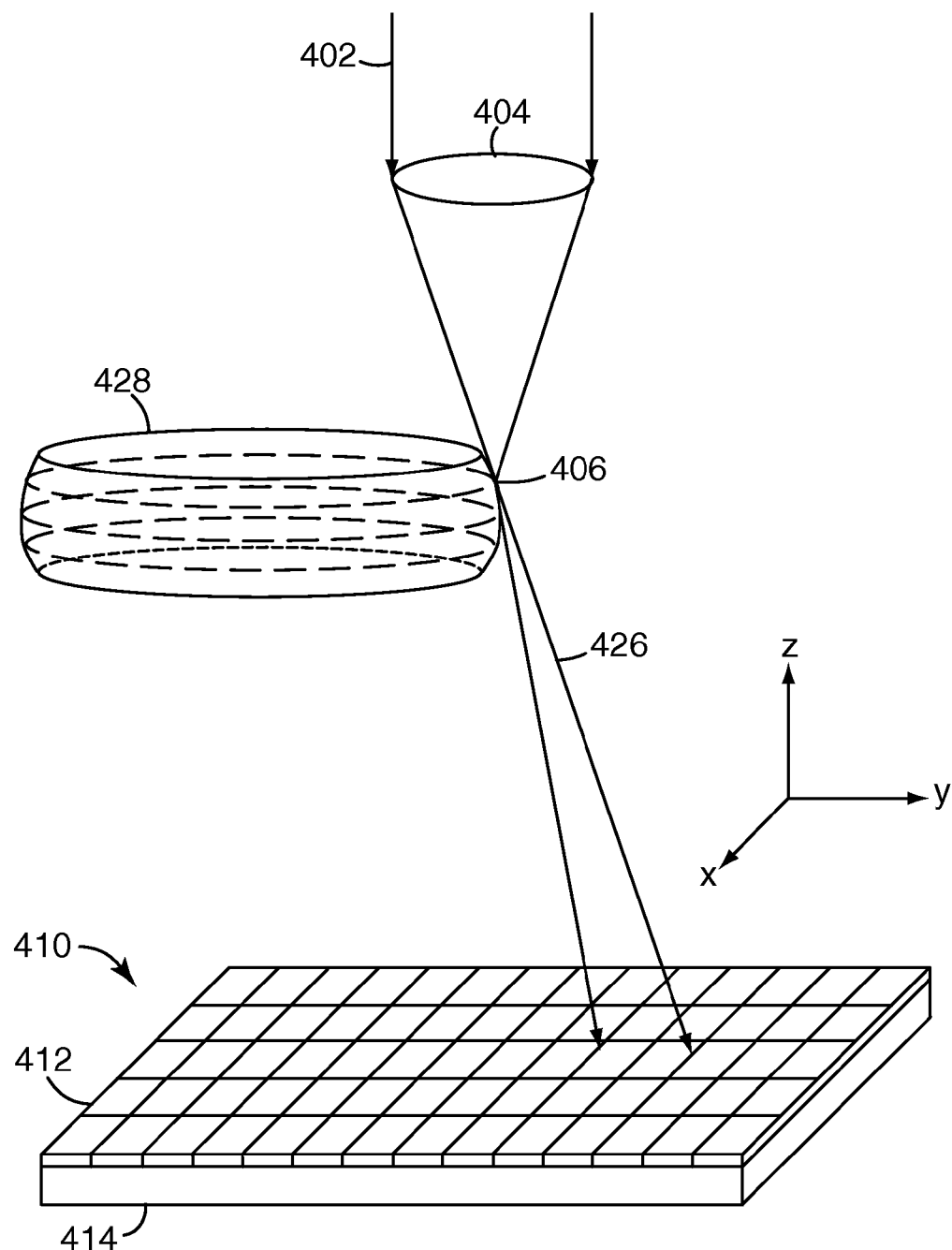
Figure 5A:
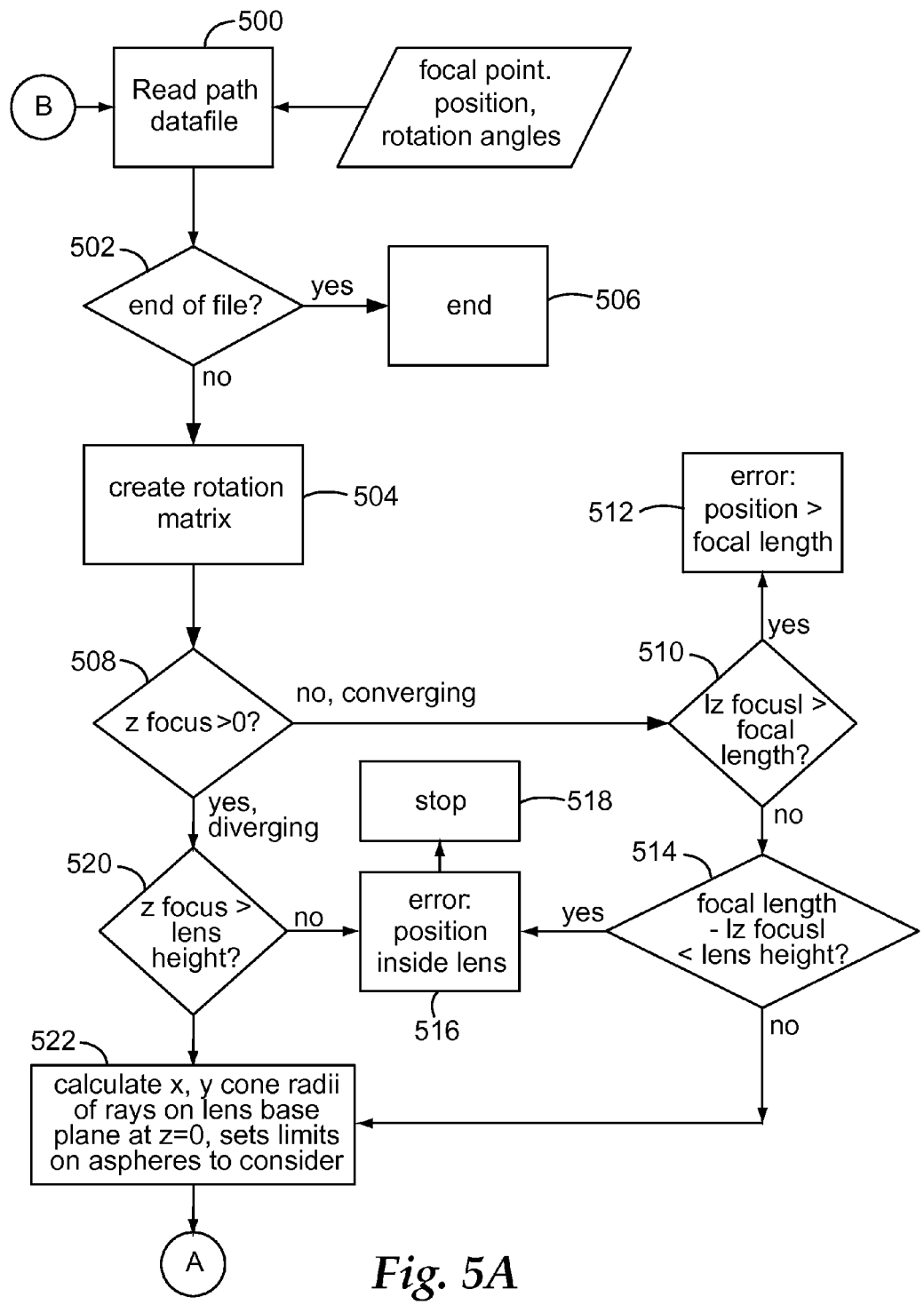
FIGS. 5A-5E present a flow chart describing an embodiment of an algorithm for determining a virtual image flux pattern, according to principles of the present invention.
Figure 5B:
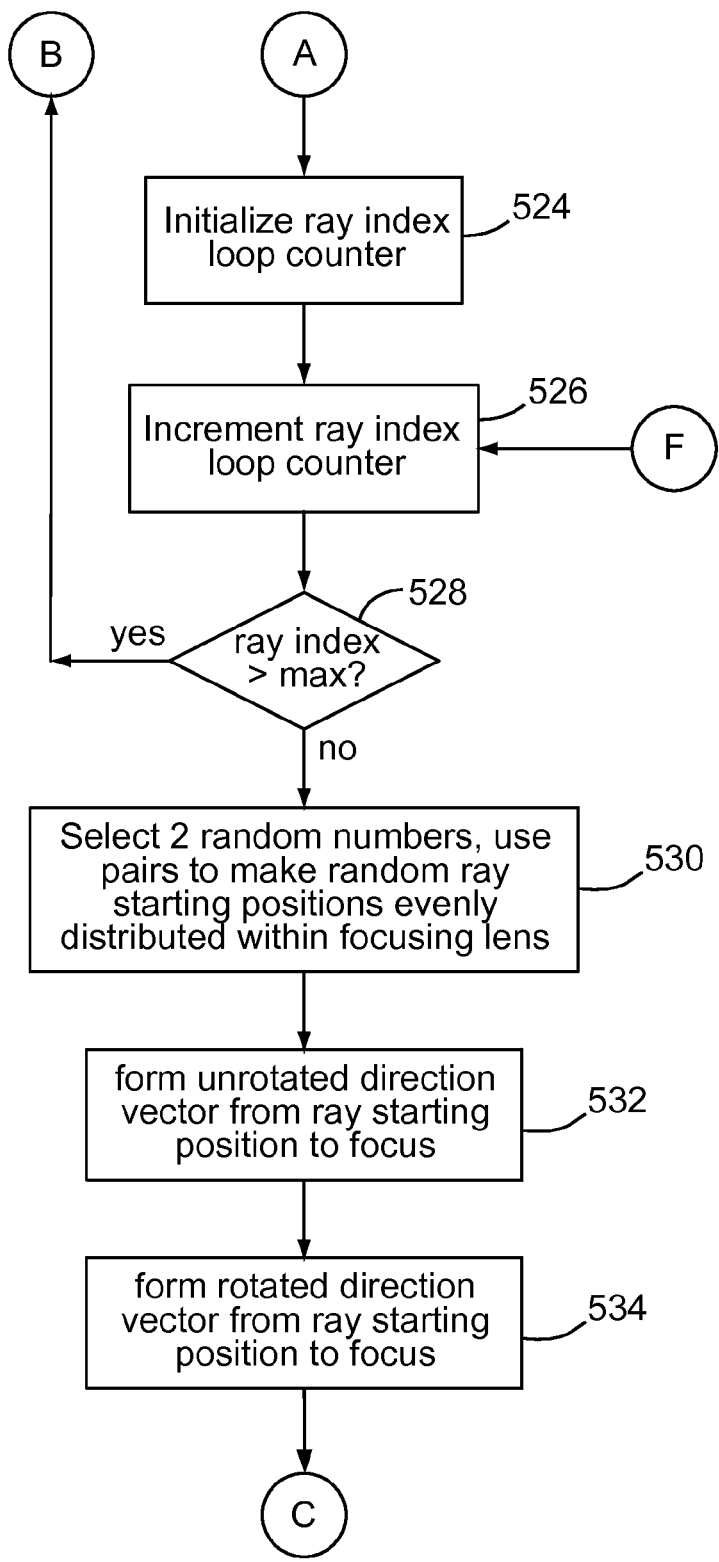
Figure 5C:
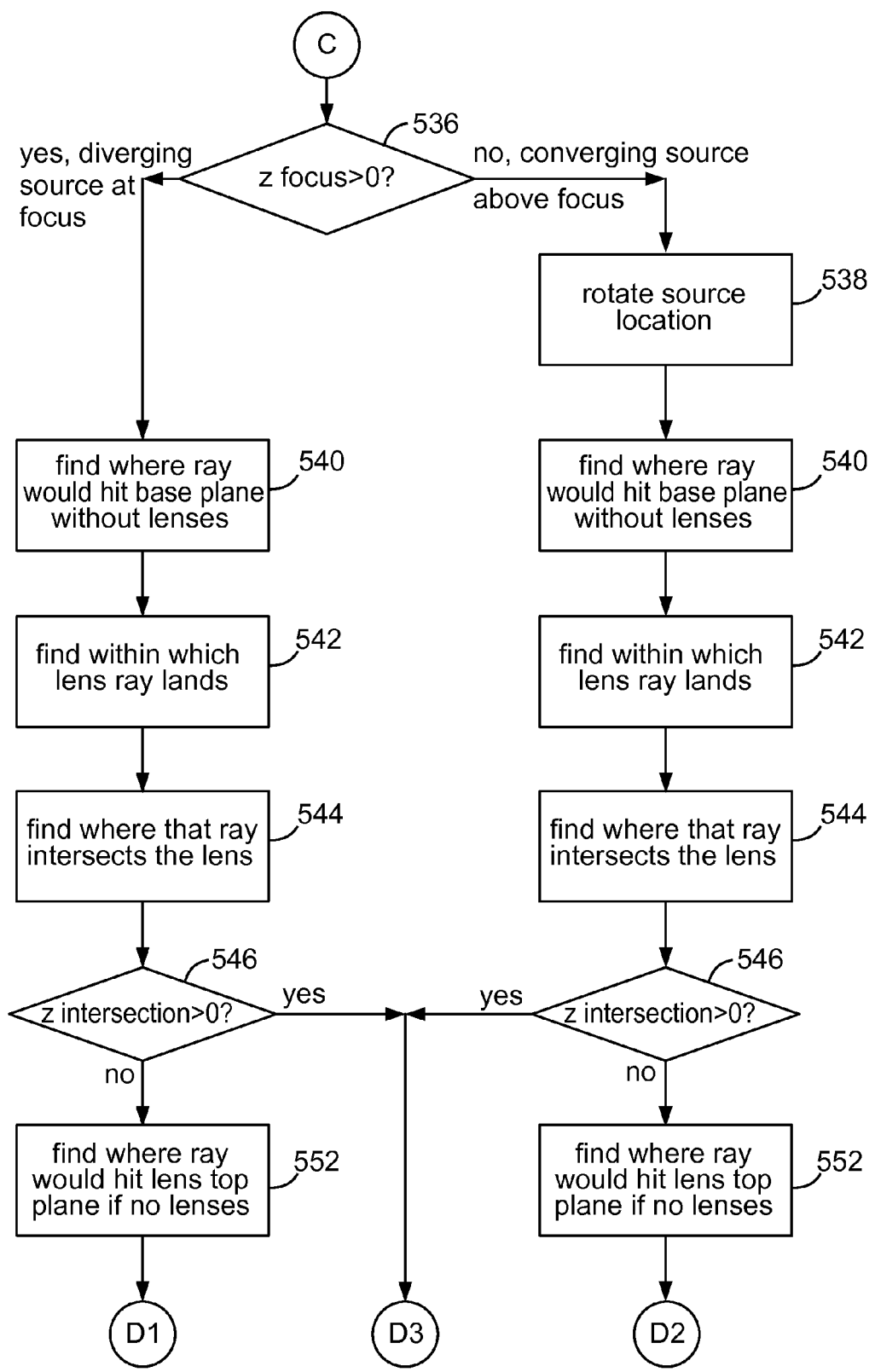
Figure 5D:
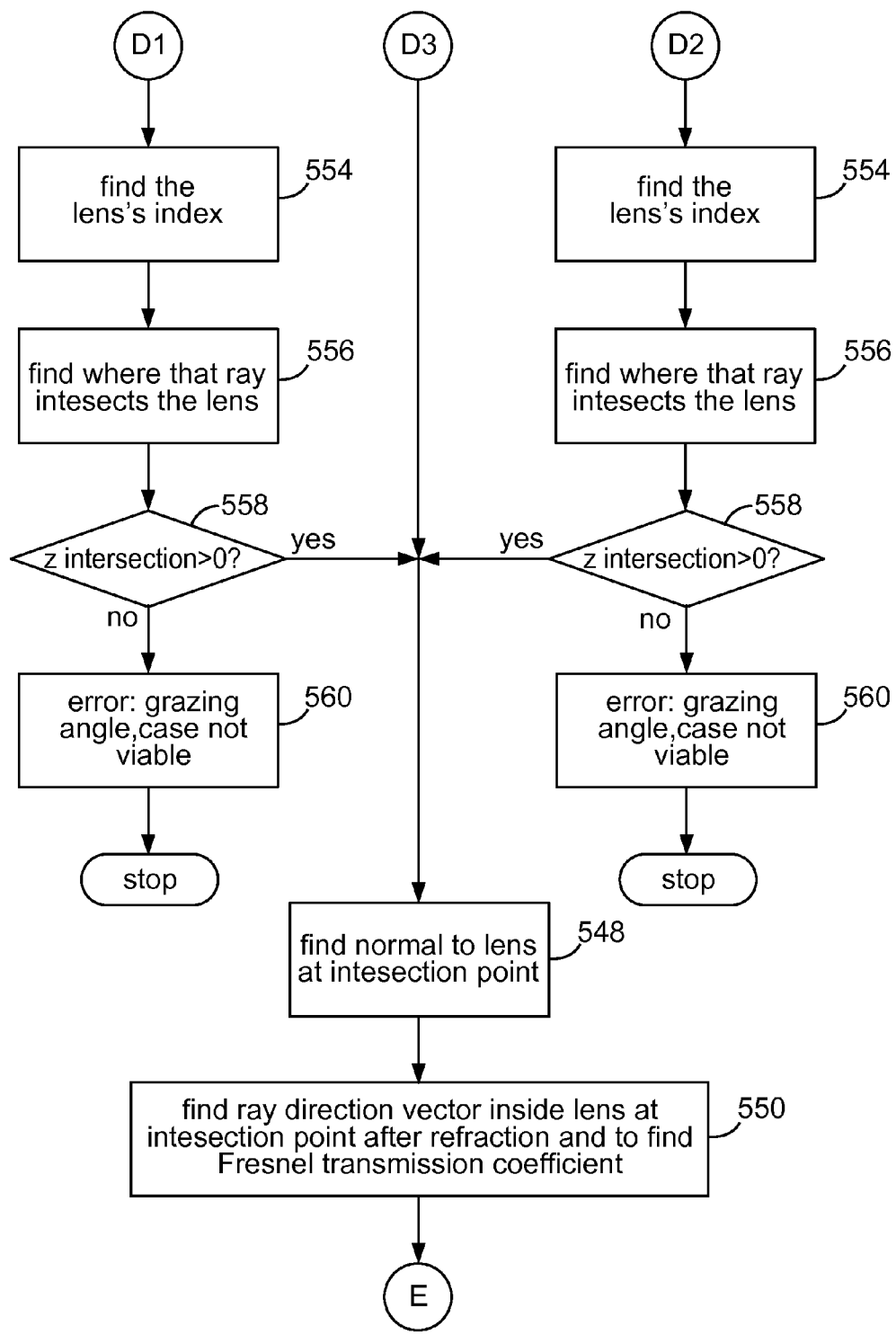
Figure 5E:
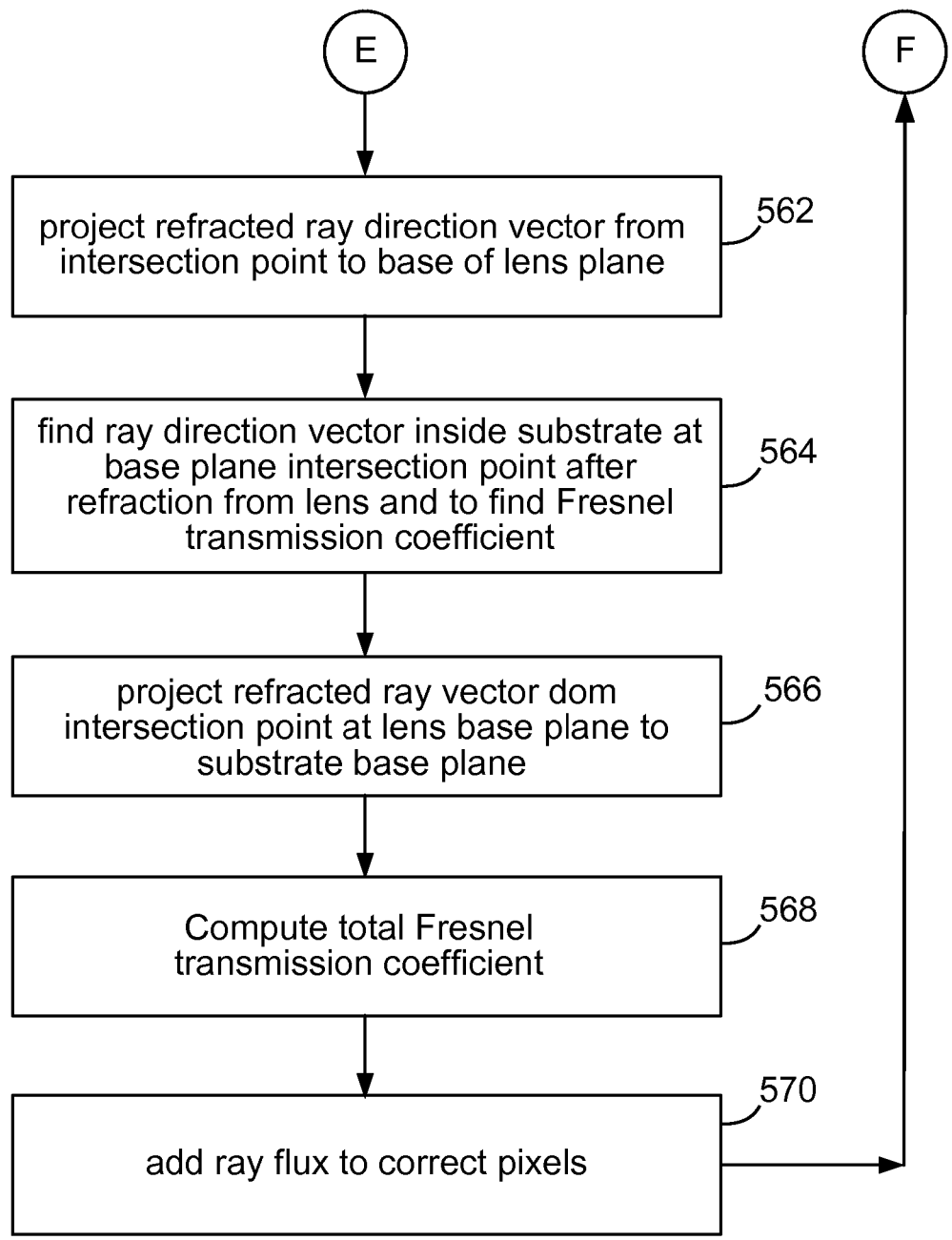

The ray tracing method can also be used to form a virtual 3D image of a solid object, as is now discussed with regard to FIG. 4B. Without loss of generality, the object 408 is assumed to be fully above the array of lenses 412. In some algorithms each source point in turn is considered to emit multiple rays throughout a prescribed solid angle with the contributions of each ray summed appropriately after it was traced through the array of lenses. When representing a 3D object 428, however, the sources are not allowed to emit into that portion of the prescribed solid angle that lies within the object's surface perimeter, and so only rays 426 which do not pass through the solid object 428 are incident at the substrate 414. This condition may occur immediately at the source point being considered, for instance if the source point is on a side of the object then part of the solid angle emission cone would lie inside the object and be excluded. This condition might also occur distant from the source point being considered, for instance if rays emanating from the source point would strike a second facet representing another source point. This might occur for example if an object's surface curves in such a manner that the second facet lies in the line-of-sight of the ray emanating from the first facet. It is desirable to exclude rays arising from one facet that intersect other facets in order to accurately represent the 3D object 428. If facets lie within the line-of-sight of an emitted ray then the ray is not considered further. If facets do not lie within the line-of-sight of the emitted ray then the ray is considered as it would be in the case of the transparent object 408. As a result, the hidden surfaces of the object 428, i.e. those surfaces that are not visible from the array of lenses within the set of emission cone angles, are not imaged.

One example of an algorithm that may be used for tracing the rays from an object to a substrate is now described with reference to the flow chart presented in FIGS. 5A-5E. The initial set up of the datafile is the first step, step 500, including the position of the focus 406 and the rotation angles (rotation angles describe the orientation of the central beam from the laser focusing lens, and may be described in any convenient system of angular orientation. One example of this is an Euler formalism, describing yaw about the z-axis, then roll about the x-axis, and then pitch about the y-axis). The beam orientation can be manipulated for biasing the viewing angles away from normal to an off-normal orientation that is described by rotation angles. A check, step 502, is made to see if the end of the datafile has been reached, and a rotation matrix is created step 504. The rotation matrix is a transfer function that accomplishes the rotation of a vector in an initial orientation in space to a final vector orientation in space. The rotation matrix may be implemented in many ways. The example, in terms of the Euler formalism mentioned above, the rotation matrix describes a 3×3 matrix that rotates a 3×1 vector in a first orientation to a second orientation. If the end of the datafile has been reached, as determined at step 502, the algorithm is terminated, step 506.

In this embodiment, the main coordinate system has an origin fixed at the lower side of the lens array 412 with the z-axis pointing upwards, normal to the lens array, in the direction shown. The lens array 412 lies parallel to the x-y plane, with the x-axis typically being set along a center axis of the lens array, centered at one of the lens centers and continuing through the centers of other lenses. Such a coordinate system is chosen for convenience, but there are other possible choices for the x-axis. The coordinate system used for the rotation matrices is that one translated with its origin at the focal point being considered at the moment; it is then used to describe the orientation of the laser beam. Lens height refers to the vertical distance between the laser focusing lens 404 and the base of the lens array 412, equivalently the top of the substrate 414. The term lens height applied to the lens array 412 means the thickness of the lenses on the lens array.

At step 508 it is determined whether the incident light 416 is converging or diverging, based on the position of the focus 406 relative to the base of the lens array 412. If the light is converging, then the magnitude of the distance between the focus 406 and the base of the lens array 412 is tested against the focal length of the lens 404, step 510. If the distance is greater than the focal length, then an error is declared, step 512. If the distance is less than the focal length, then difference between the focal length and the magnitude of the position of the focus is calculated. If this difference is less than the height of a lens of the array 412 the focus is positioned within the lens array and an error is called, step 516, and the process may be terminated, step 518. If the light is diverging, as determined at step 508, then the z-position of the focus is compared to the height of the lens array 412. If the height is less than the lens array, then the focus is inside the lens array, step 516 and the process is stopped.

At step 522 the initial light ray conditions of x, y and cone radii are set for rays at the position of the lens 404. Steps 524-528 control the loop for the number of rays considered. At step 524 the ray index counter is initialized and is incremented at step 526. If the ray index counter has reached a maximum value, as determined at step 528, then the algorithm returns to step 500. A ray is generated by selecting two random numbers to determine a random starting position for the ray at the lens 404. In the illustrated algorithm, the starting positions of the rays are distributed uniformly across the area of the lens, representing the fact that the illumination intensity is assumed to be uniform across the lens. Other illumination intensity profiles may also be used. An un-rotated direction vector is calculated for the ray, step 532, and then a rotated direction vector is calculated, step 534. The terms "un-rotated" and "rotated" refer to the states before and after orientation of a ray in space, a necessary distinction because the ray is, in general, rotated to prepare it for being traced. The randomly generated rays to be traced are initially imagined to be oriented parallel to the z-axis and perpendicular to the plane of the substrate 414. The rays are re-oriented to account both i) for any inherent tilt of the laser itself and ii) the particular orientation of the ray within the cone formed by the laser lens 404.

The orientation of the rays may be thought of in terms of either the light source plus the lens 404, or in only terms of the light rays themselves. In the case where the light rays 416 are converging when incident on the element 410, then the laser focus lies below the substrate plane. The presence of the array of lenses 412 affects the position of the focus 406 of the rays 416 and prevents the focus arising from the lens 404 alone from being used as a center of rotation for the orientation of rays 416. Instead, the lens 404 itself can be used to orient the rays 416. In the case where the light rays 416 are diverging when incident on the element 410, the 406 focus lies above the element 410 and the presence of the lens array 412 does not affect the position of the focus 406. In this case, the focus 406 may be used as a center of rotation for orienting the rays. Of course the alternative of orienting the light source and lens 404 also works in this case. Accordingly, at step 536 it is determined whether the light rays incident at the lens 404 are converging or diverging. If the light rays are converging, then the source location is rotated, step 538.

The algorithm finds which lens of the array 412 a given ray 416 will intersect such that the ray 416 may be imaged by that lens. First a calculation is performed to find where the ray 416 intersects the base plane without the lens array in place, step 540. The base plane is the lower surface of the lens array 412, which is also the upper surface of the substrate 414 if the lens array 412 is positioned on the substrate 414. For rays 416 arriving at a modest slant angle on the element 410, this position is usually within the footprint of the correct lens. The algorithm, therefore, finds which lens within which the ray 416 lands, step 542 and where that ray intersects the lens, step 544. The formula for finding the intersection of the ray with that lenslet indicates either a positive z intersection value (correct lens) or a non-positive z intersection value (wrong lens), which is tested at step 546. If the step 546 finds a non-positive z-intersection value, then the ray 416 is quite slanted, so another attempt is made to find the intersection of the ray with the horizontal plane along the top of the lenses, steps 554 and 556. This second attempt includes using the refractive index of the lens, step 554 to determine where that ray 416 intersects the lens, step 560. Then the lens directly under that intersection is tested, step 558, in the same manner as at step 546. If the z intersection of the ray 416 and that lens is positive then the correct lens intersecting the ray 416 has been found. If the z-intersection it is still negative then the lens is not the correct one. In that case a grazing ray condition is declared, step 560, and the program can stopped.

For rays 416 that have a positive z-intersection with the lens, the algorithm calculates the normal to the lens at the intersection point, step 548, and then finds the refracted direction of the ray inside the lens as well as the Fresnel transmission coefficient, step 550.

The ray 416 traveling within the lens is projected to its base, the interface with the underlying substrate 414, step 562. The algorithm then calculates the direction of the ray after passing from the lens into the substrate, step 564, and the Fresnel transmission coefficient. The ray is then projected within the substrate to the lower side of the substrate, step 566, where the ray is assumed to terminate. The projection part of step 566 may be omitted if the ray terminates at the interface between the substrate 414 and the lens array 412. The total Fresnel transmission coefficient is calculated, step 568, for the ray passing from the lens to the substrate. The flux associated with the Fresnel-adjusted ray is added to that area (pixel) of the substrate. The algorithm then returns to step 526, incrementing the ray index counter and starting the projection of a new ray until the desired number of rays has been considered.

The final output from the algorithm is a flux map showing the variation of the incident flux across the substrate. This profile is referred to as a calculated VI flux pattern, and corresponds to the profile of light that writes the virtual image in the conventional, laser-written approach. The calculated VI flux pattern is different, however, from the laser-written pattern in several ways. First, the calculated VI flux pattern can accommodate any desired wavelength, or combination of wavelengths. The laser-written pattern is written at the single wavelength of the laser used for writing. Second, the calculated flux for any pixel can cover a wide range of unit flux. This contrasts to the ablative laser-written device, where there are only two possible values of flux recorded: enough flux to ablate the material or not enough flux to ablate the material. Thus, higher resolution images are possible with this grey scale flux pattern.

In some embodiments, the calculated VI flux pattern can, therefore, be used as an input for instructing any suitable process in the manufacture of a VI substrate, or it can be used as an initial dataset that is analyzed and converted prior to use in forming the VI substrate. VI substrates may be manufactured in many different ways. For example, a VI substrate may be formed by printing a VI pattern on a substrate. The substrate in such a case could be made of any material on which is it suitable to print, such as paper, glass, polymer sheet, semiconductor, cloth and the like.

In other embodiments, the substrate may be provided with a dynamic VI pattern, i.e. not one that is permanently written on the substrate but one that can be changed. Examples of substrates which might be used for such a case include liquid crystal display (LCD) panels and arrays of light emitting diodes (LEDs). In these embodiments, the VI pattern is provided to the substrate in the form of instructions for controlling the image displayed by the LCD panel or LED array. Dynamic VI displays may be particularly useful for signs, advertising and the like.

In some embodiments, the calculated VI flux may be used as the basis for forming a replication tool, from which multiple copies of the VI floating image device may be made. One example of such a replication tool is a photomask, which can be used in a lithographic or lift off procedure to manufacture the VI substrate. In other embodiments, the VI flux can be used directly to create instructions for manufacturing a VI substrate.

Different sizes of VI device may be replicated using different types of replication tools. For example, where the VI device is relatively large, various techniques are available for making a replication tool that is later used to make a VI substrate. A replication tool may be made using any suitable technique. One example of an approach to manufacturing a replication tool is to use conventional machine tools, such as diamond milling. Another example is rapid prototyping. Rapid prototyping includes various methods such as two-photon methods, and laser polymerization. A replication tool may be used to manufacture a VI substrate via any suitable method, including molding, casting, and the like.

VI substrates may also be directly manufactured using various techniques. For example, some techniques, such as diamond milling or rapid prototyping, that can be used for manufacturing a replication tool may also be used for manufacturing a VI substrate directly. Other techniques for forming a VI substrate include, but are not limited to, printing (including color printing), casting, (including microreplication), embossing, and molding. VI substrates may be transmissive or reflective.

Where the scale is smaller it may be possible to make a VI substrate using techniques applicable to making smaller features, for example lithographic techniques. Lithographic techniques typically include the formation of a mask, such as a photomask, that is used in the exposure of a pattern on a coating on a substrate. The pattern on the mask is determined from the calculated VI flux pattern, and may be formed on the mask using any suitable method. For example masks, such as photomasks, can be formed using laser writing, two-photon processes or electron-beam writing or other processes. In some embodiments the mask is an amplitude photomask. One common example of an amplitude photomask uses a pattern formed in a Cr layer on a silica substrate, although other light blocking layers and other substrate materials may be used. For example, other metal layers such as gold, silver, nickel and titanium may be used for the light blocking layer. Other types of metals may also be suitable. Other suitable substrate materials include other inorganic materials such as glasses, silicon carbide, sapphire or other transparent metal oxides, metal fluorides such as calcium or magnesium fluoride, crystalline or fused quartz and the like.

The mask is typically used to form a pattern in a photosensitive layer such as a photoresist, and may be used for contact lithography or projection lithography. After exposing the photoresist pattern, the photoresist is normally developed, removing either the exposed or unexposed areas. The pattern in the photoresist may be transferred to a lower layer via etching, or the patterned photoresist may form the masking layer of the mask itself.

In some embodiments, the mask is used to write a pattern on a substrate that is binary. A binary pattern is one that results in the underlying substrate having a property that takes on one of two values across the substrate. The property may be any suitable characteristic such as height, optical transmission and the like. In an example, a patterned metal layer may demonstrate 0% transmission in those regions where the metal is present and high transmission where the metal is absent. In other embodiments the mask, or multiple masks with different patterns, may be used to form a substrate having a grey-scale pattern, i.e. a pattern whose property can take on more than two values across the substrate. For example, where the pattern is written into a metal layer on a substrate, different portions of the metal layer can be etched to different depths using a series of masks, so that the metal layer demonstrates an optical absorption that has multiple values across the substrate, rather than just two values.

In other embodiments, the calculated VI pattern may be used as the basis for manufacturing a phase mask, rather than an amplitude mask, for subsequent lithographic manufacturing of a VI substrate.

In other embodiments, the VI substrate may be directly manufactured using techniques like those used to form a mask. For example, the VI substrate may be formed using laser writing, e-beam writing or two-photon processes. In some embodiments, the VI substrate may be a mask.

Figure 11:
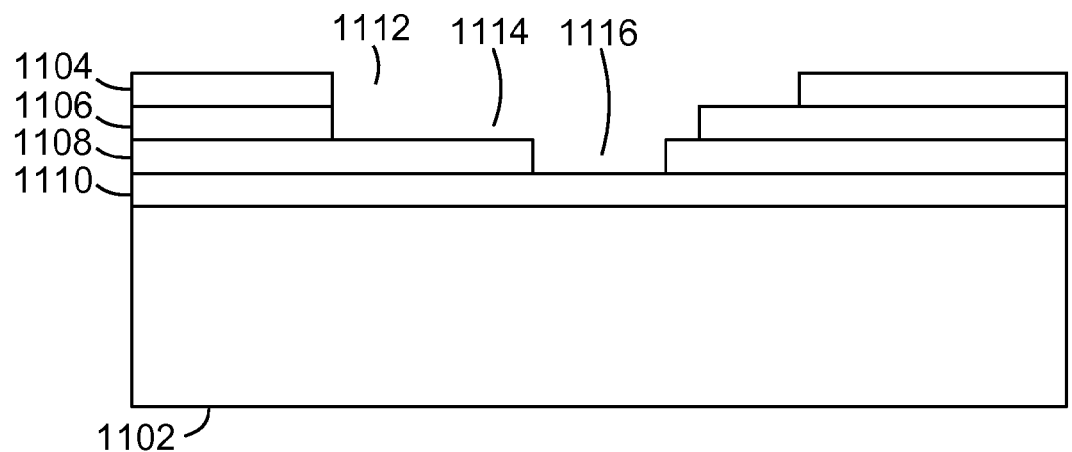
FIG. 11 schematically illustrates a cross-section through a VI substrate that shows a colored virtual image, according to principles of the present invention.

Color can be introduced to the VI substrate in various ways. In one method, the VI pattern is color printed onto the VI substrate. In a lithographic approach, different color layers can be applied to a substrate and patterned sequentially. For example, the substrate may be provided with a stack of differently colored layers. Different portions of the layers may be patterned to expose different areas of the underlying layers. This is schematically illustrated in FIG. 11, in which the device 1100 is formed with a substrate 1102 and four color layers 1104-1110. For example, the color layers 1104-1110 may include magenta 1104, yellow 1106, cyan 1108 and black 1110 layers. In this embodiment, the uppermost color layer 1104 is first patterned to produce exposed areas 1112 where it is desired to show the colors of the underlying layers 1106-1110. Next, the second layer 1106 is patterned within the exposed areas 1112 to produce exposed areas 1114 where it is desired to show the colors of the underlying layers 1108, 1110. Lastly, the third layer 1108 is patterned within the exposed areas 1114 for produce exposed areas 1116 where it is desired to show the bottom layer 1110.

In another approach, a single colored layer may be deposited on the substrate and then patterned lithographically. A second colored layer may then be deposited over the patterned first layer, and the second colored layer may then be patterned lithographically. A third layer, and subsequent layers, may then be deposited and patterned sequentially, in a process that builds up a stack of patterned colored layers. The ultimate VI substrate may look similar to the device 1100 shown in FIG. 11.

The colored layers may be formed using any suitable technique. In one embodiment, the colored layer may comprise a thin film stack, the thickness of the individual thin films being selected so that the stack reflects light over a desired range of colors. The stack may be a stack of inorganic films or polymeric films. In embodiments that use a stack of films, the thickness of the films may be uniform throughout the stack or there may be a gradient in the film thickness throughout the stack. In the latter case, the color of a region of the stack may be changed by etching the region to a desired depth. In another embodiment, the colored layer may be a layer that contains a pigment or dye to provide a desired color. In other embodiments, the colored layers may include color proofing film.

In another embodiment, a patterned colored layer may be formed by depositing a colored polymer layer on the surface of the substrate and by photopolymerizing various regions of the colored polymer layer. For example, a photopolymer containing a dye or pigment may be spun onto a substrate and the resulting layer of polymer exposed through a mask to photopolymerize certain regions of the layer. The unexposed regions may then be removed and a second photopolymer layer, colored differently from the first photopolymer layer, may be deposited and exposed using a second mask. This process may be repeated until a desired number of colored layers has been formed on the substrate. The finished VI substrate may look similar to the device 1100 shown in FIG. 11.

It will be appreciated that color layers may be formed on opaque or transparent VI substrates. In some embodiments the color layers are patterned for reflecting light. In other embodiments, the colored layers act as transmission filters for filtering light that is transmitted through the VI substrate.

Where a mask is used to form the substrate, or multiple masks are used, the pattern on the mask(s) may be referred to as an intermediate VI pattern, since the mask pattern is one that is used in an intermediate step for fabricating the ultimate VI substrate.

The substrates can be formed from any suitable material, for example glasses, semiconductors, polymers, metals, inorganic compounds and the like. In some embodiments the VI device operates in reflection, and so the substrate may be opaque. In such cases, metals and semiconductor materials may be used for the VI substrate, in addition to other materials. In other embodiments, the VI device operates in transmission, in which case the substrate preferably demonstrates low absorption to visible light. In such cases polymers, glasses, and other transparent inorganic materials can be used. Examples of suitable glasses include, but are not limited to, BK7 glass and quartz. Examples of suitable semiconductors include, but are not limited to, silicon. Examples of suitable polymers include, but are not limited to, polyethylene terephthalate (PET). Examples of suitable inorganic materials include, but are not limited to, nickel and iron.

The lenses used in the lens array generally have an image forming refractive surface in order for image formation to occur; this is typically provided by a curved lens surface. Where the lens uses curved surfaces, the lens typically has have a uniform index of refraction. Other useful materials, such as a gradient refractive index (GRIN) material does not necessarily need a curved surface to refract light. The surfaces of the lenses may be spherical in nature, or may be aspherical, or may include both spherical and non-spherical components. Furthermore, not all lenses in the lens array are restricted to having the same focal length: some lenses may have a focal length longer or shorter than others. The lenses may have any symmetry, such as cylindrical or spherical, provided real images are formed by the refraction surfaces. The lenses themselves may be of discrete form, such as round plano-convex lenslets, round double convex lenslets, rods, microspheres, beads, or cylindrical lenslets. Materials from which the lenses can be formed include glass, polymers, minerals, crystals, semiconductors and combinations of these and other materials. Non-discrete lens sheets may also be used. Thus, lenses formed from a replication or embossing process (where the surface of the sheeting is altered in shape to produce a repetitive profile with imaging characteristics) can also be used.

Lenses with a uniform refractive index of between about 1.4 and 3.0 over the visible and infrared wavelengths are commonly used. Suitable lens materials will demonstrate a low absorption of visible light for the material thicknesses used for the lenses.

Spherical lenses with radii ranging from about from 8 µm to 150 µm may be used, although lenses having other radii may be used. Good composite image resolution can be obtained by using lenses having radii in the smaller end of the aforementioned range for composite images that are to appear to be spaced apart from the lens layer by a relatively short distance, and by using larger lenses for composite images that are to appear to be spaced apart from the lenses layer by larger distances.

The lenses used in the VI element may be formed of any suitable material that is sufficiently transparent to operate as a lens. Common lens materials include polymers and glasses, although other materials may also be used. The lenses may be applied to the substrate individually but it is generally appreciated that applying the lenses to the substrate in sheet form reduces manufacturing time and costs. Any suitable method, however, for fixing the position of the lenses relative to an underlying VI substrate may be used. In many cases the lenses may be applied directly to the substrate, although this is not a necessary requirement. It is important, however, in the positioning process to ensure that the lenses are registered with the pixels on the underlying VI substrate.

One approach, discussed above, is to adhere a lens sheet to the VI substrate. In such a case, the adhesive layer may be optically transparent, although the adhesive may contain additives that provide some desired effect. For example, the adhesive may contain dyes or pigments if a particular colored effect is desired. In another approach, a lens sheet may be laminated to the substrate, for example by passing a lens sheet and substrate between heated rollers. In another approach, a lens array may be formed on the substrate by casting, in other words by curing or by otherwise solidifying a fluid layer while molding the lens shape on the substrate. This approach is particularly suitable for materials that are moldable, such as low melting point glasses and thermosetting polymers.

Figure 9:
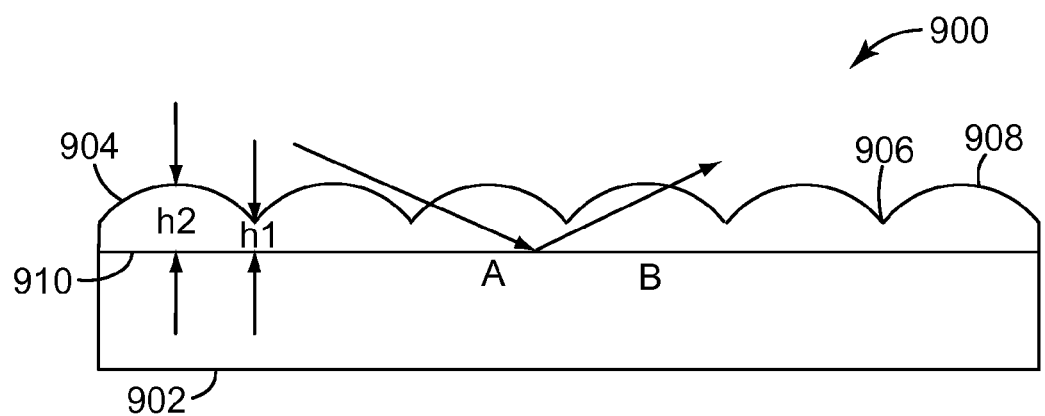
FIG. 9 schematically illustrates an embodiment of a VI device according to principles of the present invention.

A cross-section of one embodiment of a VI element 900 is schematically illustrated in FIG. 9. The VI element 900 includes a VI substrate 902 and a lens array 904 on the substrate 902. When the VI element 900 is viewed by a user, some fraction of the light incident at pixel A may be reflected at a sufficiently large angle that it exits the lens array through the lens element 908 above neighboring pixel B, rather than pixel A. This cross-talk can be deleterious to the resolution of the observed image. The minimum height between lenses 906, or the cusp between individual lens elements 908, has a height h1 above the substrate surface 910. The maximum height of a lens element 908 above the substrate surface 910 is defined as h2. One approach to reducing cross-talk between pixels is to reduce the ratio h1/h2. Lens sheets with very small values of h1 may be easily damaged due to the thin sheet. A lens array cast on the surface of the substrate, however, may be able to achieve small values of h1/h2. In some embodiments, h1/h2 is less than 50%, in other embodiments h1'h2 is less than 25% and in other approaches h1/h2 is less than 10%.

It will be appreciated that additional layers may optionally be included below the substrate, between the substrate and the lens array or above the lens array. For example, color filter or polarizing filter layers may be included with the VI element.

Figure 10:
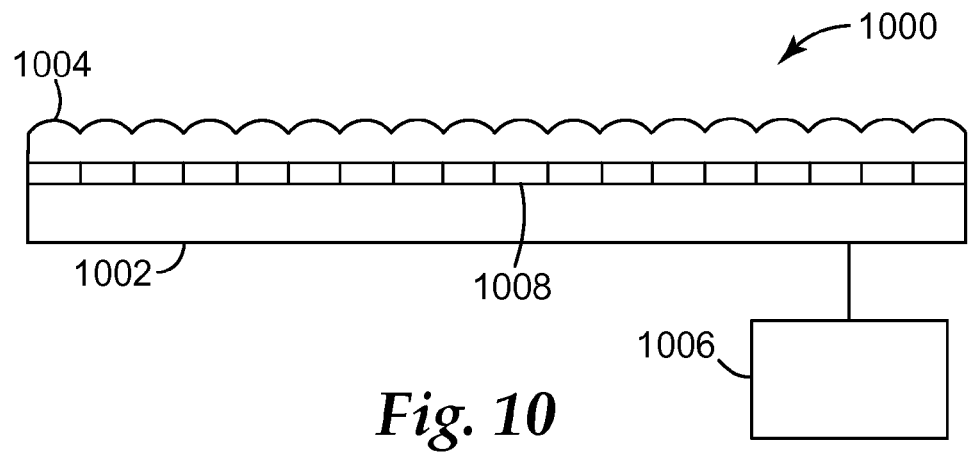
FIG. 10 schematically illustrates an embodiment of a VI device having a dynamic substrate, according to principles of the present invention.

In other embodiments, the VI substrate may be a dynamic substrate, i.e. a substrate that demonstrates a VI pattern that changes with time, instead of a VI pattern that is permanently written into a static, or non-dynamic, substrate. Thus, the VI device may be able to show different images and may even be able to show moving images. One type of dynamic VI substrate is one that includes a number of individually addressable, programmable elements. Examples of dynamic VI substrates include liquid crystal display (LCD) panels and arrays of light emitting diodes (LEDs). An embodiment of a dynamic VI device 1000 is schematically illustrated in FIG. 10. The device 1000 includes the dynamic substrate 1002 and a plurality of lenses 1004. As with the embodiments discussed above, the plurality of lenses 1004 may be provided as individual lenses or as an integrated lens array, for example in the form of a sheet. The VI pattern is provided to the dynamic substrate 1002 from a controller 1006 in the form of instructions for controlling the image displayed by the dynamic substrate. Different areas 1008, referred to here as a super-pixel, of the dynamic substrate 1002 are associated with each lens 1004. Each super-pixel 1008 may contain one or more of the individually addressable elements of the dynamic substrate 1002. For example, each lens 1004 may be associated with a super-pixel that includes a 10×10 array of addressable elements of the dynamic substrate 1002. Thus, those 10×10 addressable elements are individually controlled to approximate the flux pattern associated with a particular lens 1004. Dynamic VI displays may be particularly useful for relatively large-scale applications, such as signs, advertising and the like.

WORKED EXAMPLES

Example 1

Generation of Photomask from a Calculated VI Flux Pattern

A bitmap file was consisting of the modeled or calculated elemental image features was generated using the algorithm described above. The features in this file are grayscale and were first converted to binary in order to create a photolithographic mask. Using Adobe® Photoshop® CS3 (available from Adobe Systems Incorporated), the bitmap was converted to grayscale and the image resolution set to match the calculated resolution of the model output, in this case, 5000 pixels/cm. The model output used a pixel size of 2 μm (5000 pixels/cm) to help manage the file size during converting. A Bicubic Smoother algorithm was used to resample the image to the final resolution of 10,000 pixels/cm. A Gaussian blur filter was then applied with a value of between 0.7-1.5 pixels. For VIs of high complexity, an Unsharp Mask Filter routine (40%, 3-5 pixels) may be used to create sharper lines: a threshold filter may be applied to the data at a value of 150-200 (actual value was determined by the image complexity). Finally, the image was saved as a jpeg-type file with file compression set to 10.

Figure 6:
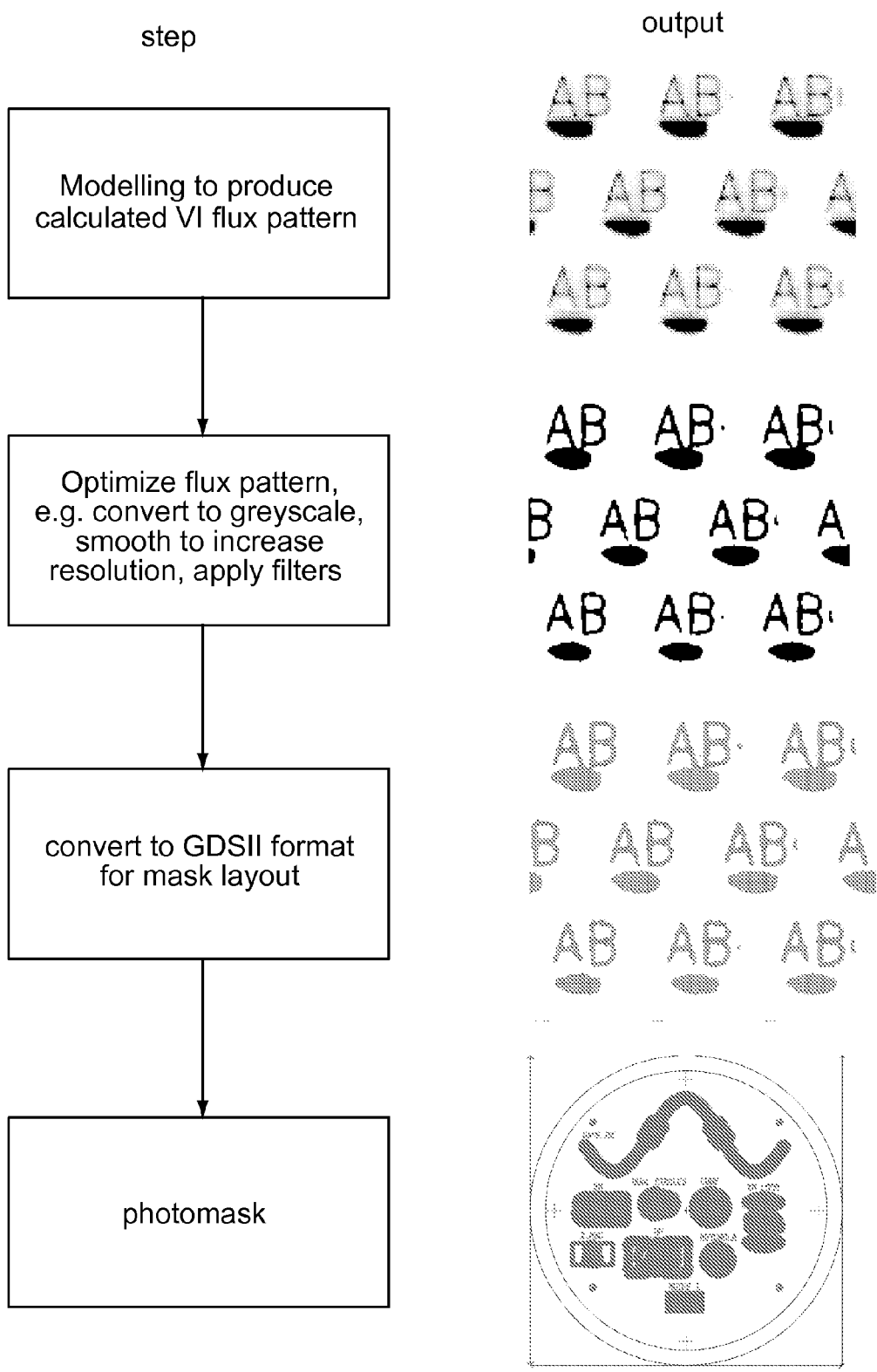
FIG. 6 shows steps in manufacturing a virtual image device using a photomask according to principles of the present invention.

In order to convert the jpeg file into a mask layout file format, ACE Translator 2007 (available from Numerical Innovations, San Diego, Calif.) was used to translate from the jpeg to the industry standard GDSII file format. The GDSII file was then loaded into a mask layout software package, L-Edit v12.6 (available from Tanner EDA, Monrovia, Calif.), where the various cells were arranged into a final format and sent for photomask manufacturing. FIG. 6 visually describes the steps involved in creating the photomask design. The photomask was used in various approaches for manufacturing a VI substrate, as discussed below.

Example 2

Fabrication of VI Replication Tools from a Photomask Master

A 10 μm thick layer of SU-8 10 photoresist (available from MicroChem Corporation, Newton, Mass.) was spin-coated onto a hexamethyldisilizane-HMDS) treated silicon wafer. Both the HMDS and SU-8 were initially spun for 5 seconds at 500 revolutions/minute, followed by 3000 revolutions/minute for 30 seconds. The coated wafer was soft baked for 2 minutes at 65° C., then at 95° C. for 6 minutes.

Figure 7:
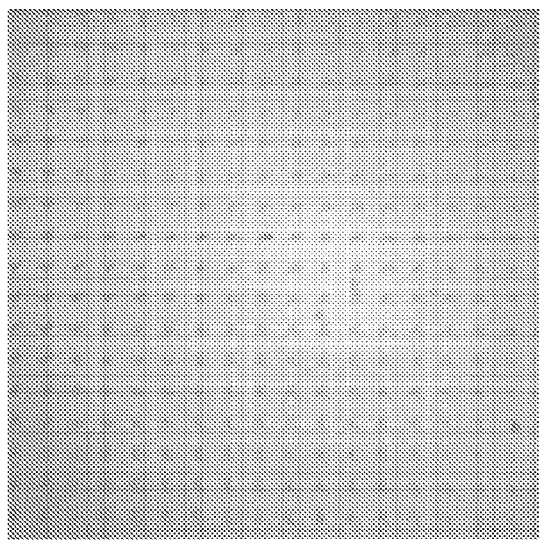
FIG. 7 illustrates an embodiment of a patterned master that may be used in fabricating a VI device according to principles of the present invention.

The photoresist was brought into contact with the photomask from Example 1 on a Quintel 7500 UV mask aligner. The SU-8 was exposed for 6.7 seconds at an irradiance of 21 mW/cm$^2$. The wafer then underwent a post exposure bake at 95° C. for 2 minutes. After 45 seconds in SU-8 Developer (also available from MicroChem Corporation) and a deionized water rinse, the pattern shown in FIG. 7 was present on the developed wafer, which could now be used as a master replication tool.

The master tool may be nickel plated to give a hard daughter tool or may be used directly as a tool after release treatment. A positive contrast resist could have been used instead if the opposite contrast or tone had been desired.

Example 3

Fabrication of High Contrast VI Substrate

Figure 8A:
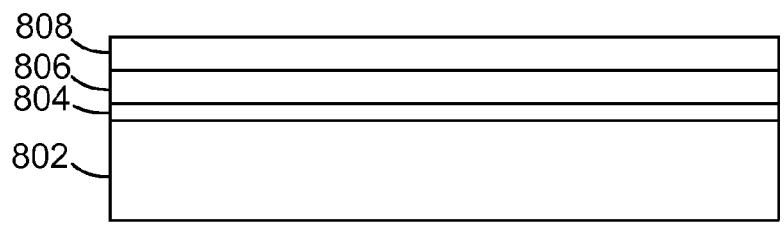
FIGS. 8A-8C schematically illustrate process steps in fabricating a VI substrate lithographically, according to principles of the present invention.
Figure 8B:
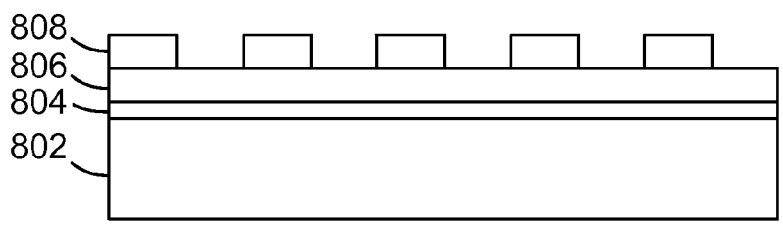
Figure 8C:
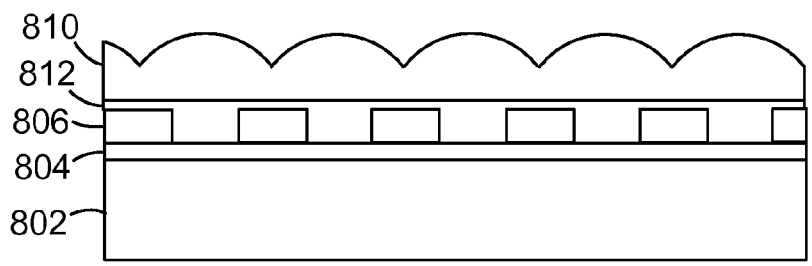

Instead of the photomask being used to fabricate the master tool, as in Example 2 above, the photomask itself may be used as a replication master, as is now described with reference to FIGS. 8A-8C. The initial substrate 802 was a piece of 5 mil thick (125 μm) polyester (PET) film coated with a 10 nm thick layer of titanium 804 followed by a 75 nm layer of aluminum 806. The substrate was then coated with a 1.3 μm thick layer of MICROPOSIT™ S1813 photoresist (available from Rohm and Haas Electronic Materials, Philadelphia, Pa.) 808 by spin coating for 40 seconds at 4000 revolutions/minute. As in Example 2, HMDS was also used as an adhesion promoter. After coating, the PET substrate was soft baked for around 30 minutes at 95° C.

After baking, the substrate was inserted in the Quintel 7500 UV mask aligner and the S1813 resist contacted the photomask described in Example 1. The photoresist was exposed to i-line UV for 6.0 seconds at an irradiance of 21 mW/cm$^2$. The photoresist was subsequently developed for 45 seconds in MICROPOSIT™ MF-319 Developer (available from Rohm and Haas Electronic Materials) and rinsed in deionized water. The exposed/developed photoresist pattern is shown in FIG. 8B.

The pattern in the photoresist was then transferred into the aluminum layer by immersing the substrate in an aluminum etch bath (500 milliliters $H_3PO_4$, 19.4 milliliters $HNO_3$, 96.8 milliliters acetic acid, 32.2 milliliters water, and 0.6 milliliters ethylene glycol) at 32° C. for around 2 minutes. The sample was then immersed in a titanium etch solution (100 milliliters ethylenedinitilotetra-acetic acid or EDTA, 8 milliliters $NH_4OH$, and 20 milliliters $H_2O_2$) at room temperature for around 30 seconds. Any aluminum or titanium not covered by the resist was removed. The photoresist was then removed with an acetone rinse followed by an isopropyl alcohol rinse. FIG. 8C shows the pattern transferred to the aluminum layer 806.

A virtual image optical element was formed by adhering a microlens array in the form of a replicated microlens film 810 to the patterned PET. In the process of attaching the microlens array, the adhesive 812, Norland 61 UV-curable adhesive (available from Norland Products, Cranbury, N.J.), was placed on the substrate and the microlens film was positioned over the VI patterned features of the aluminum layer 806. Excess adhesive was squeezed out by application of pressure from a rubber roller. The microlens film 810 was carefully aligned with each lens over a pixel of the VI pattern, and the adhesive 812 was cured for several seconds with UV light. The VI optical element produced a floating image that appeared to be of high quality and resolution when viewed by the naked eye.

Example 4

Fabrication of High Contrast VI Element Via Lift-Off

Instead of using aluminum coated PET film, a plain glass wafer was first coated with S1813 photoresist, which was then exposed and developed in the same manner as in Example 3 to produce a patterned photoresist layer on the glass wafer. Aluminum and titanium layers having the same thicknesses as those described in Example 3 were then vacuum-deposited onto the resist patterned wafer.

The metal-coated wafer was subsequently immersed for several minutes in a 65° C., ultrasonic bath containing MICROPOSIT™ 1165 Resist Remover (available from Rohm and Haas Electronic Materials) and was then rinsed in DI water. The aluminum/titanium layers remained in parts of the pattern that were bare glass while the metal in areas where there had been photoresist were lifted off, thus creating a high contrast pattern. This pattern was the negative of that formed in Example 3. A lenslet sheet was laminated to the patterned glass wafer. The resulting virtual image included a metal-colored image on a clear background.

Example 5

Fabrication of Colored VI Substrate

A photo-patternable material that contains color ingredients can be used to create colored virtual images. Kodak Color-Key Analog Color Proofing Media (available from Eastman Kodak, Rochester, N.Y.) was exposed to i-line UV in contact with a photomask containing virtual image elements, in the same manner as Example 3. The UV exposure lasted for 10 seconds at an irradiance of 21 milliwatts/centimeter$^2$.

The exposed film was then immersed for approximately 1 minute in Kodak Polychrome Graphics Color Proofing Pre Mixed Hand Developer (available from Eastman Kodak, Rochester, N.Y.) and upon removing from the bath, the patterned material was lightly rubbed with a cloth saturated with the developer material to reveal the pattern. Finally, the film was rinsed in deionized water before drying.

Single color virtual Images were formed by adhering pieces of replicated microlens film to the patterned PET in the same manner as Example 3. Multiple color virtual images are possible by overlaying a number of these patterned, color sheets.

The present invention should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the present specification. The claims are intended to cover such modifications and devices.

We claim:

1. A method of manufacturing a virtual image display device for displaying an object, comprising:
   calculating an initial virtual image flux pattern based on the object; and
   fabricating a substrate having a virtual image array pattern based on the initial virtual image flux pattern; further comprising applying a plurality of lenses over the virtual image array pattern.

2. A method as recited in claim 1, wherein applying the plurality of lenses comprises placing a lens array proximate the substrate.

3. A method as recited in claim 2, wherein placing the lens array proximate the substrate comprises attaching the lens array to the substrate.

4. A method as recited in claim 1, wherein calculating the initial virtual image flux pattern comprises i) virtually tracing rays generated by different source facets on the object to an image plane; and ii) summing the rays from different source facets of the object at different locations in an image plane to form the initial virtual image flux pattern.

5. A method as recited in claim 4, wherein summing the rays comprises ignoring rays from source facets that pass through other facets before reaching the image plane.

6. A method as recited in claim 4, wherein the rays are traced generally in a z-direction and further comprising virtually slicing the object into parallel slices, the source facets corresponding to positions around the edges of the parallel slices, and the slices lying generally parallel to an x-y plane perpendicular to the z-direction.

7. A method as recited in claim 1, wherein fabricating the substrate comprises printing the virtual image array pattern on the substrate.

8. A method as recited in claim 1, wherein fabricating the substrate comprises lithographically forming the virtual image array pattern on the substrate.

9. A method of making a virtual image element, comprising:
   forming a virtual image substrate having a virtual image pattern; and
   placing a plurality of lenses proximate the virtual image substrate after forming the virtual image substrate.

10. A method as recited in claim 9, wherein forming the virtual image substrate comprises making a virtual image master and forming the virtual image substrate using the virtual image master.

11. A method as recited in claim 9, wherein forming the virtual image substrate comprises printing a virtual image pattern on substrate material.

12. A method as recited in claim 9, wherein forming the virtual image substrate comprises at least one of embossing a virtual image pattern on substrate material, casting a virtual image pattern on substrate material, laser writing a virtual image pattern on substrate material, 2-photon writing a virtual image pattern on substrate material and e-beam writing a virtual image pattern on substrate material.

13. A method as recited in claim 9, wherein placing a plurality of lenses proximate the virtual image substrate comprises adhering the plurality of lenses to the virtual image substrate using adhesive.

14. A method as recited in claim 13, wherein the plurality of lenses comprises a sheet of lenses and adhering the plurality of lenses to the virtual image substrate comprises adhering the sheet of lenses to the virtual image substrate.

* * * * *